US010012504B2

(12) United States Patent
Roumeliotis et al.

(10) Patent No.: US 10,012,504 B2
(45) Date of Patent: *Jul. 3, 2018

(54) EFFICIENT VISION-AIDED INERTIAL NAVIGATION USING A ROLLING-SHUTTER CAMERA WITH INACCURATE TIMESTAMPS

(71) Applicant: Regents of the University of Minnesota, Minneapolis, MN (US)

(72) Inventors: Stergios I. Roumeliotis, St Paul, MN (US); Chao Guo, Minneapolis, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 252 days.

This patent is subject to a terminal disclaimer.

(21) Appl. No.: 14/733,468

(22) Filed: Jun. 8, 2015

(65) Prior Publication Data

US 2015/0369609 A1  Dec. 24, 2015

Related U.S. Application Data

(60) Provisional application No. 62/014,532, filed on Jun. 19, 2014.

(51) Int. Cl.
*G01C 21/16* (2006.01)
*H04N 5/232* (2006.01)
(Continued)

(52) U.S. Cl.
CPC ........... *G01C 21/165* (2013.01); *G06T 7/277* (2017.01); *G06T 2207/30241* (2013.01); *G06T 2207/30244* (2013.01)

(58) Field of Classification Search
None
See application file for complete search history.

(56) References Cited

U.S. PATENT DOCUMENTS 5,847,755 A   12/1998  Wixson et al.
6,104,861 A    8/2000  Tsukagoshi
(Continued)

FOREIGN PATENT DOCUMENTS

WO   WO 2015013418 A2   1/2015
WO   WO 2015013534 A1   1/2015

OTHER PUBLICATIONS

NPL Sliding Windows and Persistence: An Application of Topological Methods to Signal Analysis Perea, Jose; Harer, John, eprint arXiv:1307.6188, Jul. 2013, arXiv:1307.6188v2.*

(Continued)

*Primary Examiner* — Ryan Rink
*Assistant Examiner* — Paul A Castro
(74) *Attorney, Agent, or Firm* — Shumaker & Sieffert, P.A.

(57) ABSTRACT

Vision-aided inertial navigation techniques are described. In one example, a vision-aided inertial navigation system (VINS) comprises an image source to produce image data at a first set of time instances along a trajectory within a three-dimensional (3D) environment, wherein the image data captures features within the 3D environment at each of the first time instances. An inertial measurement unit (IMU) to produce IMU data for the VINS along the trajectory at a second set of time instances that is misaligned with the first set of time instances, wherein the IMU data indicates a motion of the VINS along the trajectory. A processing unit comprising an estimator that processes the IMU data and the image data to compute state estimates for 3D poses of the IMU at each of the first set of time instances and 3D poses of the image source at each of the second set of time instances along the trajectory. The estimator computes each of the poses for the image source as a linear interpolation from a subset of the poses for the IMU along the trajectory.

28 Claims, 6 Drawing Sheets

(51) Int. Cl.
  G06T 7/00    (2017.01)
  G06T 7/20    (2017.01)
  G06T 1/00    (2006.01)
  G06T 7/277   (2017.01)

(56) References Cited

U.S. PATENT DOCUMENTS

| | | | |
|---|---|---|---|
| 7,015,831 | B2 | 3/2006 | Karlsson et al. |
| 7,162,338 | B2 | 1/2007 | Goncalves et al. |
| 7,991,576 | B2 | 8/2011 | Roumeliotis |
| 8,577,539 | B1 | 11/2013 | Morrison et al. |
| 8,965,682 | B2* | 2/2015 | Tangirala .............. G01C 21/165 701/408 |
| 8,996,311 | B1 | 3/2015 | Morin et al. |
| 9,031,809 | B1* | 5/2015 | Kumar .................. G01C 21/165 702/150 |
| 9,243,916 | B2 | 1/2016 | Roumeliotis et al. |
| 9,607,401 | B2 | 3/2017 | Roumeliotis et al. |
| 9,658,070 | B2 | 5/2017 | Roumeliotis et al. |
| 2002/0198632 | A1 | 12/2002 | Breed et al. |
| 2004/0073360 | A1 | 4/2004 | Foxlin |
| 2004/0167667 | A1 | 8/2004 | Goncalves et al. |
| 2005/0013583 | A1 | 1/2005 | Itoh |
| 2008/0167814 | A1 | 7/2008 | Samarasekem et al. |
| 2008/0265097 | A1 | 10/2008 | Stecko et al. |
| 2008/0279421 | A1 | 11/2008 | Hamza et al. |
| 2009/0248304 | A1 | 10/2009 | Roumeliotis et al. |
| 2010/0110187 | A1 | 5/2010 | von Flotow et al. |
| 2010/0220176 | A1 | 9/2010 | Ziemeck et al. |
| 2012/0121161 | A1 | 5/2012 | Eade |
| 2012/0194517 | A1 | 8/2012 | Izadi et al. |
| 2013/0335562 | A1* | 12/2013 | Ramanandan ........ G06T 7/2053 348/142 |
| 2014/0316698 | A1 | 10/2014 | Roumeliotis et al. |
| 2014/0333741 | A1 | 11/2014 | Roumeliotis et al. |
| 2015/0356357 | A1* | 12/2015 | McManus .......... G06K 9/00791 382/104 |
| 2015/0369609 | A1 | 12/2015 | Roumeliotis et al. |
| 2016/0005164 | A1 | 1/2016 | Roumeliotis et al. |
| 2016/0161260 | A1 | 6/2016 | Mourikis |
| 2016/0305784 | A1 | 10/2016 | Roumeliotis et al. |
| 2016/0327395 | A1 | 11/2016 | Roumeliotis et al. |

OTHER PUBLICATIONS

Guo et al., "Resource-Aware Large-Scale Cooperative 3D Mapping from Multiple Cell Phones," Multiple Autonomous Robotic Systems (MARS) Lab, ICRA Poster May 26-31, 2015, 1 pp.
Guo et al., "Efficient Visual-Inertial Navigation using a Rolling-Shutter Camera with Inaccurate Timestamps," Proceedings of Robotics: Science and Systems, Jul. 2014, 9 pp.
Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.
Latif et al., "Applying Sparse '1-Optimization to Problems in Robotics," Latif et al., "Applying Sparse '1-Optimization to Problems in Robotics," ICRA 2014 Workshop on Long Term Autonomy, Jun. 2014, 3 pp.
Lee et al., "Pose Graph-Based RGB-D SLAM in Low Dynamic Environments," ICRA Workshop on Long Term Autonomy, 2014, (Applicant points out, in accordance with MPEP 609.04(a), that the year of publication, 2014, is sufficiently earlier than the effective U.S. filing date, 2017, so that the particular month of publication is not in issue.) 19 pp.
Taylor et al., "Parameterless Automatic Extrinsic Calibration of Vehicle Mounted Lidar-Camera Systems," Conference Paper, Mar. 2014, 4 pp.
Ayache et al., "Maintaining Representations of the Environment of a Mobile Robot," IEEE Transactions on Robotics and Automation, vol. 5, No. 6, Dec. 1989, pp. 804-819.

Bartoli et al., "Structure from Motion Using Lines: Representation, Triangulation and Bundle Adjustment," Computer Vision and Image Understanding, vol. 100, Aug. 11, 2005, pp. 416-441.
Bayard et al., "An Estimation Algorithm for Vision-Based Exploration of Small Bodies in Space," 2005 American Control Conference, Jun. 8-10, 2005, pp. 4589-4595.
Breckenridge, "Interoffice Memorandum to T. K. Brown, Quaternions—Proposed Standard Conventions," IOM 343-79-1199, Oct. 31, 1979, 12 pp.
Canny, "A Computational Approach to Edge Detection," IEEE Transactions on Pattern Analysis and Machine Intelligence, vol. 8, No. 6, Nov. 1986, pp. 679-698.
Chen, "Pose Determination from Line-to-Plane Correspondences: Existence Condition and Closed-Form Solutions," Proceedings on the $3^{rd}$ International Conference on Computer Vision, Dec. 4-7, 1990, pp. 374-378.
Chiuso et al., "Structure From Motion Causally Integrated Over Time," IEEE Transactions on Pattern Analysis and Machine Intelligence, vol. 24, No. 4, Apr. 2002, pp. 523-535.
Davison et al., "Simultaneous Localisation and Map-Building Using Active Vision," Jun. 2001, 18 pp.
Deans "Maximally Informative Statistics for Localization and Mapping," Proceedings of the 2002 IEEE International Conference on Robotics & Automation, May 2002, pp. 1824-1829.
Dellaert et al., "Square Root SAM: Simultaneous Localization and Mapping via Square Root Information Smoothing," International Journal of Robotics and Research, vol. 25, No. 12, Dec. 2006, pp. 1181-1203.
Diel, "Stochastic Constraints for Vision-Aided Inertial Navigation," Massachusetts Institute of Technology, Department of Mechanical Engineering, Master Thesis, Jan. 2005, 106 pp.
Eade et al., "Scalable Monocular SLAM," Proceedings of the 2006 IEEE Computer Society Conference on Computer Vision and Pattern Recognition (CVPR '06) vol. 1, Jun. 17-22, 2006, 8 pp.
Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.
Eustice et al., "Exactly Sparse Delayed-slate Filters for View-based SLAM," IEEE Transactions on Robotics, vol. 22, No. 6, Dec. 2006, pp. 1100-1114.
Eustice et al., "Visually Navigating the RMS Titanic With SLAM Information Filters," Proceedings of Robotics Science and Systems, Jun. 2005, 9 pp.
Guo et al., "IMU-RGBD Camera 3D Pose Estimation and Extrinsic Calibration: Observability Analysis and Consistency Improvement," Proceedings of the IEEE International Conference on Robotics and Automation. May 6-10, 2013, pp. 2935-2942.
Guo et al., "Observability-constrained EKF Implementation of the IMU-RGBD Camera Navigation Using Point and Plane Features," Technical Report, University of Minnesota, Mar. 2013, 6 pp.
Hermann et al., "Nonlinear Controllability and Observability," IEEE Transactions on Automatic Control, vol. 22, No. 5, Oct. 1977, pp. 728-740.
Herrera et al., "Joint Depth and Color Camera Calibration with Distortion Correction," IEEE Transactions On Pattern Analysis and Machine Intelligence, vol. 34, No. 10, Oct. 2012, pp. 2058-2064.
Hesch et al., "Observability-constrained Vision-aided Inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Huang et al., "Visual Odometry and Mapping for Autonomous Flight Using an RGB-D Camera," Proceedings of the International Symposium on Robotics Research, Aug. 28-Sep. 1, 2011, 16 pp.
Huster, "Relative Position Sensing by Fusing Monocular Vision and Inertial Rate Sensors," Stanford University, Department of Electrical Engineering, Dissertation, Jul. 2003, 158 pp.
Johannsson et al., "Temporally Scalable Visual Slam Using a Reduced Pose Graph," in Proceedings of the IEEE International Conference on Robotics and Automation, May 6-10, 2013, 8 pp.

(56) References Cited

OTHER PUBLICATIONS

Jones et al., "Visual-inertial Navigation, Mapping and Localization: A Scalable Real-time Causal Approach," International Journal of Robotics Research, vol. 30, No. 4, Mar. 31, 2011, pp. 407-430.
Kaess et al., "iSAM: Incremental Smoothing and Mapping," IEEE Transactions on Robotics, Manuscript, Sep. 7, 2008, 14 pp.
Golub et al., "Matrix Multiplication Problems," Chapter 1, Matrix Computations, Third Edition, ISBN 0-8018-5413-X, 1996, (Applicant points out, in accordance with MPEP 609.04(a), that the year of publication, 1996, is sufficiently earlier than the effective U.S. filing date, so that the particular month of publication is not in issue.).
"Kalman filter," Wikipedia, the Free Encyclopedia, accessed from https://en.wikipedia.org/w/index.php?title=Kalman_filter&oldid=615383582, drafted Jul. 3, 2014, 27 pp.
Thorton et al., "Triangular Covariance Factorizations for Kalman Filtering," Technical Memorandum 33-798, National Aeronautics and Space Administration, Oct. 15, 1976, 212 pp.
Shalom et al., "Estimation with Applications to Tracking and Navigation," Chapter 7, Estimation with Applications to Tracking and Navigation, ISBN 0-471-41655-X, Jul. 2001, 20 pp.
Higham, "Matrix Inversion," Chapter 14, Accuracy and Stability of Numerical Algorithms, Second Edition, ISBN 0-89871-521-0, 2002, 29 pp. (Applicant points out, in accordance with MPEP 609.04(a), that the year of publication, 2002, is sufficiently earlier than the effective U.S. filing date, so that the particular month of publication is not in issue.).
U.S. Appl. No. 14/768,733, by Stergios I. Roumeliotis et al., filed Feb. 2014.
U.S. Appl. No. 14/796,574, by Stergios I. Roumeliotis et al., filed Jul. 10, 2015.
U.S. Appl. No. 15/601,261, by Stergios I. Roumeliotis et al., filed May 22, 2017.
U.S. Appl. No. 15/605,448, by Stergios I. Roumeliotis et al., filed May 25, 2017.
U.S. Appl. No. 15/706,149, by Stergios I. Roumeliotis et al., filed Sep. 15, 2017.
Kaess et al., "iSAM2: Incremental Smoothing and Mapping Using the Bayes Tree," International Journal of Robotics Research, vol. 31, No. 2, Feb. 2012, pp. 216-235.
Klein et al., "Parallel Tracking and Mapping for Small AR Workspaces," Proceedings of the IEEE and ACM International Symposium on Mixed and Augmented Reality, Nov. 13-16, 2007, pp. 225-234.
Konolige et al., "Efficient Sparse Pose Adjustment for 2D Mapping," Proceedings of the IEEE/RSJ International Conference on Intelligent Robots and Systems, Oct. 18-22, 2010, pp. 22-29.
Konolige et al., "FrameSLAM: From Bundle Adjustment to Real-Time Visual Mapping," IEEE Transactions on Robotics, vol. 24, No. 5, Oct. 2008, pp. 1066-1077.
Konolige et al., "View-based Maps," International Journal of Robotics Research, vol. 29, No. 8, Jul. 2010, pp. 941-957.
Kottas et al., "On the Consistency of Vision-aided Inertial Navigation," Proceedings of the International Symposium on Experimental Robotics, Jun. 17-20, 2012, 15 pp.
Kummerle et al., "g²o: A General Framework for Graph Optimization," Proceedings of the IEEE International Conference on Robotics and Automation, May 9-13, 2011, pp. 3607-3613.
Langelaan, "State Estimation for Autonomous Flight in Cluttered Environments," Stanford University, Department of Aeronautics and Astronautics, Dissertation, Mar. 2006, 128 pp.
Liu et al., "Estimation of Rigid Body Motion Using Straight Line Correspondences," Computer Vision, Graphics, and Image Processing, vol. 43, No. 1, Jul. 1988, pp. 37-52.
Li et al., "Improving the Accuracy of EKF-based Visual-Inertial Odometry," 2012 IEEE International Conference on Robotics and Automation, May 14-18, 2012, pp. 828-835.
Lowe, "Distinctive Image Features From Scale-Invariant Keypoints," International Journal of Computer Vision, Jan. 5, 2004, 28 pp.
Lupton et al., "Visual-inertial-aided Navigation for High-dynamic Motion in Built Environments Without Initial Conditions," IEEE Transactions on Robotics, vol. 28, No. 1, Feb. 2012, pp. 61-76.
Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.
Matas et al., "Robust Detection of Lines Using the Progressive Probabilistic Hough Transformation," Computer Vision and Image Understanding, vol. 78, No. 1, Apr. 2000, pp. 119-137.
McLauchlan, "The Variable State Dimension Filter Applied to Surface-Based Structure From Motion CVSSP Technical Report VSSP-TR-4/99," University of Surrey, Department of Electrical Engineering, Dec. 1999, 52 pp.
Meltzer et al., "Edge Descriptors for Robust Wide-baseline Correspondence," IEEE Conference on Computer Vision and Pattern Recognition, Jun. 23-28, 2008, pp. 1-8.
Mirzaei et al., "A Kalman Filter-Based Algorithm for IMU-Camera Calibration: Observability Analysis and Performance Evaluation," IEEE Transactions on Robotics, vol. 24, No. 5, Oct. 2008, pp. 1143-1156.
Mirzaei et al., "Globally Optimal Pose Estimation from Line Correspondences," IEEE International Conference on Robotics and Automation, May 9-13, 2011, pp. 5581-5588.
Mirzaei et al., "Optimal Estimation of Vanishing Points in a Manhattan World," IEEE International Conference on Computer Vision, Nov. 6-13, 2011, pp. 2454-2461.
Montiel et al., "Unified Inverse Depth Parametrization for Monocular Slam," Proceedings of Robotics: Science and Systems II (RSS-06), Aug. 16-19, 2006, 8 pp.
Mourikis et al., "A Multi-State Constraint Kalman Filter for Vision-aided Inertial Navigation," IEEE International Conference on Robotics and Automation, Apr. 10-14, 2007, pp. 3565-3572.
Mourikis et al., "Vision-Aided Inertial Navigation for Spacecraft Entry, Descent, and Landing," IEEE Transactions on Robotics, vol. 25, No. 2, Apr. 2009, pp. 264-280.
Mourikis et al., "On the Treatment of Relative-Pose Measurements for Mobile Robot Localization," Proceedings of the 2006 IEEE International Conference on Robotics and Automation, May 2006, pp. 2277-2284.
Nister et al., "Visual Odometry for Ground Vehicle Applications," Journal of Field Robotics, vol. 23, No. 1, Jan. 2006, 35 pp.
Oliensis, "A New Structure From Motion Ambiguity," IEEE Transactions on Pattern Analysis and Machine Intelligence, vol. 22, No. 7, Jul. 2000, 30 pp.
Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filing date and any foreign priority date of Jun. 19, 2014 so that the particular month of publication is not in issue.).
Prazenica et al., "Vision-Based Kalman Filtering for Aircraft State Estimation and Structure From Motion," AIAA Guidance, Navigation, and Control Conference and Exhibit, Aug. 15-18, 2005, 13 pp.
Roumeliotis et al., "Stochastic Cloning: A Generalized Framework for Processing Relative State Measurements," Proceedings of the 2012 IEEE International Conference on Robotics and Automation, May 11-15, 2002, pp. 1788-1795.
Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date and any foreign priority date of Jun. 19, 2014 so that the particular month of publication is not in issue.).
Schmid et al., "Automatic Line Matching Across Views," Proceedings of the IEEE Computer Science Conference on Computer Vision and Pattern Recognition, Jun. 17-19, 1997, pp. 666-671.
Servant et al., "Improving Monocular Plane-based SLAM with Inertial Measurements," 2010 IEEE/RSJ International Conference on Intelligent Robots and Systems, Oct. 18-22, 2010, pp. 3810-3815.

(56) References Cited

OTHER PUBLICATIONS

Sibley et al., "Sliding Window Filter with Application to Planetary Landing," Journal of Field Robotics, vol. 27, No. 5, Sep./Oct. 2010, pp. 587-608.
Smith et al., "On the Representation and Estimation of Spatial Uncertainty," International Journal of Robotics Research, vol. 5, No. 4, 1986, pp. 56-68 (Applicant points out that, in accordance with MPEP 609.04(a), the 1986 year of publication is sufficiently earlier than the effective U.S. filing date and any foreign priority date of Jun. 19, 2014 so that the particular month of publication is not in issue.).
Smith et al., "Real-time Monocular Slam with Straight Lines," British Machine Vision Conference, vol. 1, Sep. 2006, pp. 17-26.
Soatto et al., "Motion Estimation via Dynamic Vision," IEEE Transactions on Automatic Control, vol. 41, No. 3, Mar. 1996, pp. 393-413.
Soatto et al., "Recursive 3-D Visual Motion Estimation Using Subspace Constraints," International Journal of Computer Vision, vol. 22, No. 3, Mar. 1997, pp. 235-259.
Spetsakis et al., "Structure from Motion Using Line Correspondences," International Journal of Computer Vision, vol. 4, No. 3, Jun. 1990, pp. 171-183.
Strelow, "Motion Estimation From Image and Inertial Measurements," Carnegie Mellon University, School of Computer Science, Dissertation, CMU-CS-04-178, Nov. 2004, 164 pp.
Taylor et al., "Structure and Motion from Line Segments in Multiple Images," IEEE Transactions on Pattern Analysis and Machine Intelligence, vol. 17, No. 11, Nov. 1995, pp. 1021-1032.
Trawny et al., "Indirect Kalman Filter for 3D Attitude Estimation," University of Minnesota, Department of Computer Science & Engineering, MARS Lab, Mar. 2005, 25 pp.
Triggs et al., "Bundle Adjustment—A Modern Synthesis," Vision Algorithms: Theory & Practice, LNCS 1883, Apr. 12, 2002, 71 pp.
Weiss et al., "Real-time Metric State Estimation for Modular Vision-inertial Systems," 2011 IEEE International Conference on Robotics and Automation, May 9-13, 2011, pp. 4531-4537.
Weiss et al., "Real-time Onboard Visual-Inertial State Estimation and Self-Calibration of MAVs in Unknown Environments," 2012 IEEE International Conference on Robotics and Automation, May 14-18, 2012, pp. 957-964.
Weiss et al., "Versatile Distributed Pose Estimation and sensor Self-Calibration for an Autonomous MAV," 2012 IEEE International Conference on Robotics and Automations, May 14-18, 2012, pp. 31-38.
Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.
Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.
Zhou et al., "Determining 3-D Relative Transformations for Any Combination of Range and Bearing Measurements," IEEE Transactions on Robotics, vol. 29, No. 2, Apr. 2013, pp. 458-474.
Horn et al., "Closed-form solution of absolute orientation using orthonormal matrices," Journal of the Optical Society of America A, vol. 5, No. 7, Jul. 1988, pp. 1127-1135.
Kottas et al., "Efficient and Consistent Vision-aided Inertial Navigation using Line Observations," Department of Computer Science & Engineering, University of Minnesota, MARS Lab, TR-2012-002, Sep. 2012, 14 pp.
Bierman, "Factorization Methods for Discrete Sequential Estimation," Mathematics in Science and Engineering, Academic Press, vol. 128, 1977, 259 pp.
Lucas et al., "An iterative image registration technique with an application to stereo vision," Proceedings of $7^{th}$ the International Joint Conference on Artificial Intelligence, Aug. 24-28, 1981, pp. 674-679.

Kneip et al., "Robust Real-Time Visual Odometry with a Single Camera and an IMU," Proceedings of the British Machine Vision Conference, Aug. 29-Sep. 2, 2011, pp. 16.1-16.11.
Chiu et al., "Robust vision-aided navigation using sliding-window factor graphs," 2013 IEEE International Conference on Robotics and Automation, May 6-10, 2013, pp. 46-53.
Kottas et al., "An iterative Kalman smoother for robust 3D localization on mobile and wearable devices," Proceedings of the IEEE International Conference on Robotics and Automation, May 26-30, 2015, pp. 6336-6343.
Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.
Li et al., "Vision-aided inertial navigation with rolling-shutter cameras," The International Journal of Robotics Research, retrieved from ijr.sagepub.com on May 22, 2015, 18 pp.
Ait-Aider et al., "Simultaneous object pose and velocity computation using a single view from a rolling shutter camera," Proceedings of the IEEE European Conference on Computer Vision, May 7-13, 2006, pp. 56-68.
Baker et al., "Removing rolling shutter wobble," Proceedings of the IEEE Conference on Computer Vision and Pattern Recognition, Jun. 13-18, 2010, pp. 2392-2399.
Boyd et al., "Convex Optimization," Cambridge University Press, 2004, 730 pp. (Applicant points out that, in accordance with MPEP 609.04(a), the 2004 year of publication is sufficiently earlier than the effective U.S. filing date and any foreign priority date of Jun. 19, 2014 so that the particular month of publication is not in issue.).
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filing date and any foreign priority date of Jun. 19, 2014 so that the particular month of publication is not in issue.)
Guo et al., "IMU-RGBD camera 3D pose estimation and extrinsic calibration: Observability analysis and consistency improvement," Proceedings of the IEEE International Conference on Robotics and Automation, May 6-10, 2013, pp. 2920-2927.
Harris et al., "A combined corner and edge detector," Proceedings of the Alvey Vision Conference, Aug. 31-Sep. 2, 1988, pp. 147-151.
Hesch et al., "Consistency analysis and improvement of vision-aided inertial navigation," IEEE Transactions on Robotics, vol. 30, No. 1, Feb. 2014, pp. 158-176.
Huang et al., "Observability-based rules for designing consistent EKF slam estimators," International Journal of Robotics Research, vol. 29, No. 5, Apr. 2010, pp. 502-528.
Jia et al., "Probabilistic 3-D motion estimation for rolling shutter video rectification from visual and inertial measurements," Proceedings of the IEEE International Workshop on Multimedia Signal Processing, Sep. 2012, pp. 203-208.
Kelly et al., "A general framework for temporal calibration of multiple proprioceptive and exteroceptive sensors," Proceedings of International Symposium on Experimental Robotics, Dec. 18-21, 2010, 15 pp.
Kelly et al., "Visual-inertial sensor fusion: Localization, mapping and sensor-to-sensor self-calibration," International Journal of Robotics Research, vol. 30, No. 1, Jan. 2011, pp. 56-79.
Li et al., "3-D motion estimation and online temporal calibration for camera-IMU systems," Proceedings of the IEEE International Conference on Robotics and Automation, May 6-10, 2013, pp. 5709-5716.
Liu et al., "Multi-aided inertial navigation for ground vehicles in outdoor uneven environments," Proceedings of the IEEE International Conference on Robotics and Automation, Apr. 18-22, 2005, pp. 4703-4708.
Oth et al., "Rolling shutter camera calibration," Proceedings of the IEEE Conference on Computer Vision and Pattern Recognition, Jun. 23-28, 2013, pp. 1360-1367.

(56) References Cited

OTHER PUBLICATIONS

Shoemake et al., "Animating rotation with quaternion curves," ACM SIGGRAPH Computer Graphics, vol. 19, No. 3, Jul. 22-26, 1985, pp. 245-254.

Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.

Garcia et al., "Augmented State Kalman Filtering for AUV Navigation." Proceedings of the 2002 IEEE International Conference on Robotics & Automation, May 2002, 6 pp.

Bouguet, "Camera Calibration Toolbox for Matlab," retrieved from http://www.vision.caltech.edu/bouguetj/calib_doc/., Oct. 14, 2015, 5 pp.

Dong-Si et al., "Motion Tracking with Fixed-lag Smoothing: Algorithm and Consistency Analysis," Proceedings of the IEEE International Conference on Robotics and Automation, May 9-13, 2011, 8 pp.

Golub et al., "Matrix Computations, Fourth Edition," The Johns Hopkins University Press, 2013, 780 pp.

Leutenegger et al., "Keyframe-based visual-inertial odometry using nonlinear optimization," The International Journal of Robotics Research, vol. 34, No. 3, Mar. 2015, pp. 314-334.

Li et al., "Optimization-Based Estimator Design for Vision-Aided Inertial Navigation," Proceedings of the Robotics: Science and Systems Conference, Jul. 9-13, 2012, 8 pp.

Mourikis et al., "A Dual-Layer Estimator Architecture for Long-term Localization," Proceedings of the Workshop on Visual Localization for Mobile Platforms, Jun. 24-26, 2008, 8 pp.

Nerurkar et al., "C-KLAM: Constrained Keyframe-Based Localization and Mapping," Proceedings of the IEEE International Conference on Robotics and Automation, May 31-Jun. 7, 2014, 6 pp.

"Project Tango," retrieved from https://www.google.com/atap/projecttango on Nov. 2, 2015, 4 pp.

Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.

Guo et al., "Resource-Aware Large-Scale Cooperative 3D Mapping from Multiple Cell Phones," Poster submitted to the International Robotics and Automation Conference, May 26-31, 2015, 1 pp.

Kottas et al., "An Iterative Kalman Smoother for Robust 3D Localization and mapping," ISRR, Tech Report, Oct. 16, 2014, 15 pp.

Kottas et al., "An Iterative Kalman Smoother for Robust 3D Localization on Mobile and Wearable devices," Submitted confidentially to International Conference on Robotics & Automation, ICRA '15, May 5, 2015, 8 pp.

Agarwal et al., "A Survey of Geodetic Approaches to Mapping and the Relationship to Graph-Based SLAM," IEEE Robotics and Automation Magazine, vol. 31, Sep. 2014, 17 pp.

U.S. Appl. No. 15/601,261, by Stergios I. Roumeliotis, filed May 22, 2017.

U.S. Appl. No. 15/470,595, by Stergios I. Roumeliotis, filed Mar. 27, 2017.

U.S. Appl. No. 15/130,736, by Stergios I. Roumeliotis, filed Apr. 15, 2016.

U.S. Appl. No. 15/605,448, by Stergios I. Roumeliotis, filed May 25, 2017.

\* cited by examiner

EFFICIENT VISION-AIDED INERTIAL NAVIGATION USING A ROLLING-SHUTTER CAMERA WITH INACCURATE TIMESTAMPS

This application claims the benefit of U.S. Provisional Patent Application No. 62/014,532, filed Jun. 19, 2014, the entire contents of which are incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity within the robotics community as a method to address GPS-denied navigation.

Among the methods employed for tracking the six-degrees-of-freedom (d.o.f.) position and orientation (pose) of a sensing platform within GPS-denied environments, vision-aided inertial navigation is one of the most prominent, primarily due to its high precision and low cost. During the past decade, VINS have been successfully applied to spacecraft, automotive, and personal localization, demonstrating real-time performance.

SUMMARY

In general, this disclosure describes various techniques for use within a vision-aided inertial navigation system (VINS). More specifically, this disclosure presents a linear-complexity inertial navigation system for processing rolling-shutter camera measurements. To model the time offset of each camera row between the IMU measurements, an interpolation-based measurement model is disclosed herein, which considers both the time synchronization effect and the image read-out time. Furthermore, Observability-Constrained Extended Kalman filter (OC-EKF) is described for improving the estimation consistency and accuracy, based on the system's observability properties.

In order to develop a VINS operable on mobile devices, such as cell phones and tablets, one needs to consider two important issues, both due to the commercial-grade underlying hardware: (i) the unknown and varying time offset between the camera and IMU clocks, and (ii) the rolling-shutter effect caused by certain image sensors, such as typical CMOS sensors. Without appropriately modelling their effect and compensating for them online, the navigation accuracy will significantly degrade. In one example, a linear-complexity technique is introduced for fusing inertial measurements with time-misaligned, rolling-shutter images using a highly efficient and precise linear interpolation model.

As described herein, compared to alternative methods, the proposed approach achieves similar or better accuracy, while obtaining significant speed-up. The high accuracy of the proposed techniques is demonstrated through real-time, online experiments on a cellphone.

Further, the techniques may provide advantages over conventional techniques that attempt to use offline methods for calibrating a constant time offset between a camera or other image source and an IMU, or the readout time of a rolling-shutter camera. For example, the equipment required for offline calibration is not always available. Furthermore, since the time offset between the two clocks may jitter, the result of an offline calibration process may be of limited use.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5A illustrates experiment 1 and plots the trajectory of the cell phone estimated by the algorithms under consideration. FIG. 5B illustrates experiment 2 and plots the trajectory of the cell phone estimated online.

DETAILED DESCRIPTION

The increasing range of sensing capabilities offered by modern mobile devices, such as cell phones, as well as their increasing computational resources make them ideal for applying VINS. Fusing visual and inertial measurements on a cell phone or other consumer-oriented mobile device, however, requires addressing two key problems, both of which are related to the low-cost, commercial-grade hardware used. First, the camera and inertial measurement unit (IMU) often have separate clocks, which may not be synchronized. Hence, visual and inertial measurements which may correspond to the same time instant will be reported with a time difference between them. Furthermore, this time offset may change over time due to inaccuracies in the sensors' clocks, or clock jitters from CPU overloading. Therefore, high-accuracy navigation on a cell phone requires modeling and online estimating such time parameters. Second, commercial-grade CMOS sensors suffer from the rolling-shutter effect; that is each pixel row of the imager is read at a different time instant, resulting in an ensemble distorted image. Thus, an image captured by a rolling-shutter camera under motion will contain bearing measurements to features which are recorded at different camera poses. Achieving high-accuracy navigation requires properly modeling and compensating for this phenomenon.

It is recognized herein that both the time synchronization and rolling-shutter effect correspond to a time offset between visual and inertial measurements. A new measurement model is introduced herein for fusing rolling-shutter images that have a time offset with inertial measurements. By exploiting the underlying kinematic motion model, one can employ the estimated linear and rotational velocity for relating camera measurements with IMU poses corresponding to different time instants.

Figure 1:
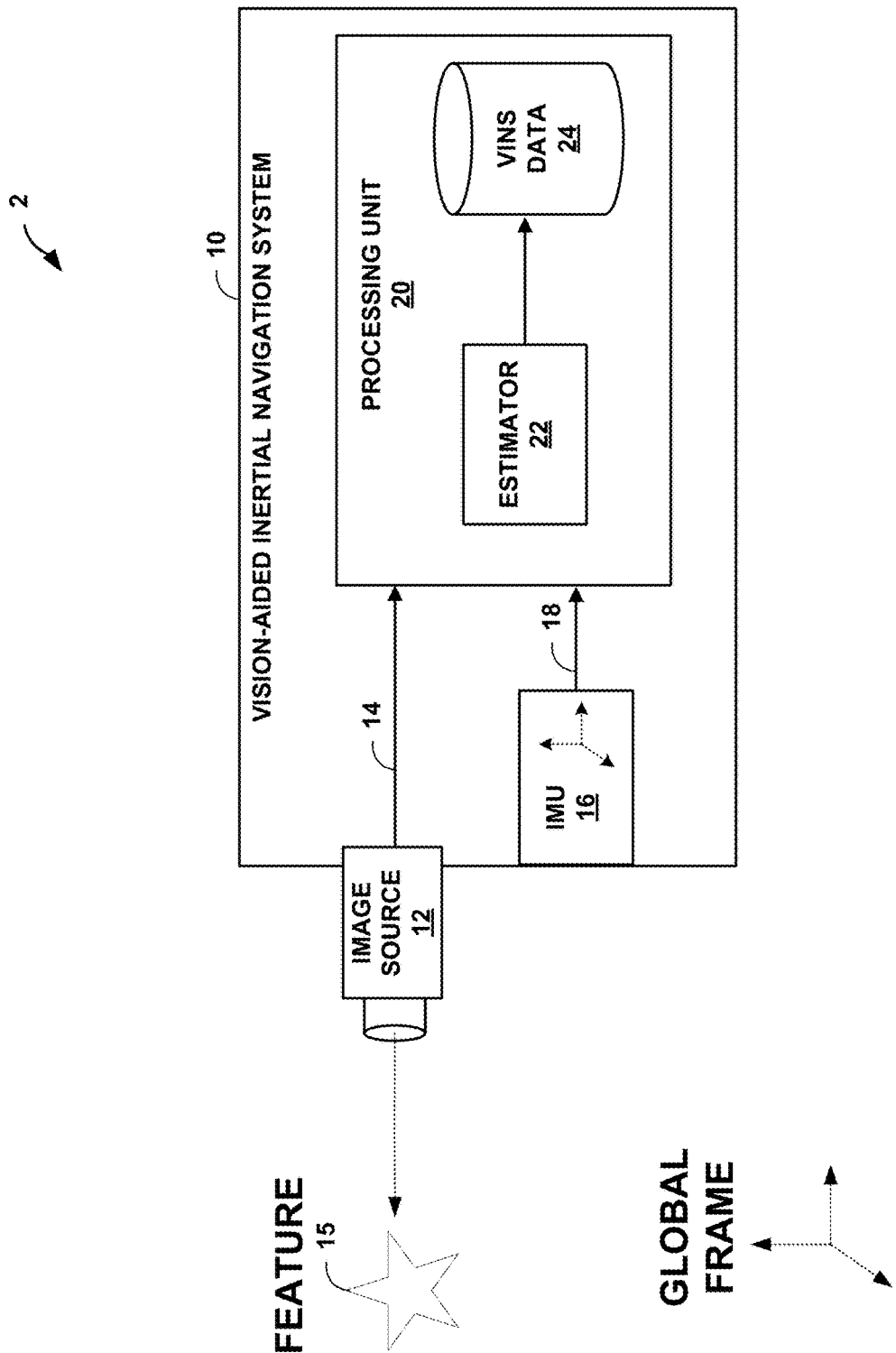
FIG. 1 is a block diagram illustrating a vision-aided inertial navigation system comprising an IMU and a camera.

FIG. 1 is a block diagram illustrating a vision-aided inertial navigation system (VINS) 10 comprising at least one image source 12 and an inertial measurement unit (IMU) 14. VINS 10 may be a standalone device or may be integrated within our coupled to a mobile device, such as a robot, a mobile computing device such as a mobile phone, tablet, laptop computer or the like.

Image source 12 images an environment in which VINS 10 operates so as to produce image data 14. That is, image source 12 provides image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system having multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance a first clock associated with the camera source. In other words, image source 12 may produce image data 14 at each of a first set of time instances along a trajectory within the three-dimensional (3D) environment, wherein the image data captures features 15 within the 3D environment at each of the first time instances.

IMU 16 produces IMU data 18 indicative of a dynamic motion of VINS 10. IMU 14 may, for example, detect a current rate of acceleration using one or more accelerometers as VINS 10 is translated, and detect changes in rotational attributes like pitch, roll and yaw using one or more gyroscopes. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In many cases the time offset may be unknown, thus leading to time synchronization issues In general, estimator 22 of processing unit 20 process image data 14 and IMU data 18 to compute state estimates for the degrees of freedom of VINS 10 and, from the state estimates, computes position, orientation, speed, locations of observable features, a localized map, an odometry or other higher order derivative information represented by VINS data 24. In one example, estimator 22 comprises an Extended Kalman Filter (EKF) that estimates the 3D IMU pose and linear velocity together with the time-varying IMU biases and a map of visual features 15. Estimator 22 may, in accordance with the techniques described herein, apply estimation techniques that compute state estimates for 3D poses of IMU 16 at each of the first set of time instances and 3D poses of image source 12 at each of the second set of time instances along the trajectory.

As described herein, estimator 12 applies an interpolation-based measurement model that allows estimator 12 to compute each of the poses for image source 12, i.e., the poses at each of the first set of time instances along the trajectory, as a linear interpolation of a selected subset of the poses computed for the IMU. In one example, estimator 22 may select the subset of poses for IMU 16 from which to compute a given pose for image source 12 as those IMU poses associated with time instances that are adjacent along the trajectory to the time instance for the pose being computed for the image source. In another example, estimator 22 may select the subset of poses for IMU 16 from which to compute a given pose for image source 12 as those IMU poses associated with time instances that are adjacent within a sliding window of cached IMU poses and that have time instances that are closest to the time instance for the pose being computed for the image source. That is, when computing state estimates in real-time, estimator 22 may maintain a sliding window, referred to as the optimization window, of 3D poses previously computed for IMU 12 at the first set of time instances along the trajectory and may utilize adjacent IMU poses within this optimization window to linearly interpolate an intermediate pose for image source 12 along the trajectory.

The techniques may be particularly useful in addressing the rolling shutter problem described herein. For example, in one example implementation herein the image source comprises at least one sensor in which image data is captured and stored in a plurality of rows or other set of data structures that are read out at different times. As such, the techniques may be applied such that, when interpolating the 3D poses for the image source, estimator 22 operates on each of the rows of image data as being associated with different ones of the time instances. That is, each of the rows (data structures) is associated with a different one of the time instances along the trajectory and, therefore associated with a different one of the 3D poses computed for the image source using the interpolation-based measurement model. In this way, each of the data structures (e.g., rows) of image source 12 may be logically treated as a separate image source with respect to state estimation.

Furthermore, in one example, when computing state estimates, estimator 22 may prevent projection of the image data and IMU data along at least one unobservable degree of freedom, referred to herein as Observability-Constrained Extended Kalman filter (OC-EKF). As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated. By preventing projection of image data 14 and IMU data 18 along at least one unobservable degree of freedom, the techniques may improve consistency and reduce estimation errors as compared to conventional VINS.

Example details of an estimator 22 for a vision-aided inertial navigation system (VINS) in which the estimator enforces the unobservable directions of the system, hence preventing spurious information gain and reducing inconsistency, can be found in U.S. patent application Ser. No.

14/186,597, entitled "OBSERVABILITY-CONSTRAINED VISION-AIDED INERTIAL NAVIGATION," filed Feb. 21, 2014, and U.S. Provisional Patent Application Ser. No. 61/767,701, filed Feb. 21, 2013, the entire content of each being incorporated herein by reference.

This disclosure applies an interpolation-based camera measurement model, targeting vision-aided inertial navigation using low-grade rolling-shutter cameras. In particular, the proposed device introduces an interpolation model for expressing the camera pose of each visual measurement, as a function of adjacent IMU poses that are included in the estimator's optimization window. This method offers a significant speedup compared to other embodiments for fusing visual and inertial measurements while compensating for varying time offset and rolling shutter. In one example, the techniques may be further enhanced by determining the system's unobservable directions when applying our interpolation measurement model, and may improve the VINS consistency and accuracy by employing an Observability-Constrained Extended Kalman filter (OC-EKF). The proposed algorithm was validated in simulation, as well as through real-time, online and offline experiments using a cell phone.

Most prior work on VINS assumes a global shutter camera perfectly synchronized with the IMU. In such a model, all pixel measurements of an image are recorded at the same time instant as a particular IMU measurement. However, this is unrealistic for most consumer devices mainly for two reasons:

(i) The camera and IMU clocks may not be synchronized. That is, when measuring the same event, the time stamp reported by the camera and IMU will differ.

(ii) The camera and IMU may sample at a different frequency and phase, meaning that measurements do not necessarily occur at the same time instant. Thus, a varying time delay, $t_d$, between the corresponding camera and IMU measurements exists, which needs to be appropriately modelled.

In addition, if a rolling-shutter camera is used, an extra time offset introduced by the rolling-shutter effect, is accounted for. Specifically, the rolling-shutter camera reads the imager row by row, so the time delay for a pixel measurement in row m with image readout time tm can be computed as $t_m = m t_r$, where $t_r$ is the read time of a single row.

Although the techniques are described herein with respect to applying an interpolation-based measurement model to compute interpolated poses for image source 12 from closes poses computed for IMU 16, the techniques may readily be applied in reverse fashion such that IMU poses are computed from and relative to poses for the image source. Moreover, the techniques described herein for addresses time synchronization and rolling shutter issues can be applied to any device having multiple sensors where measurement data from the sensors are not aligned in time and may vary in time.

Figure 2:
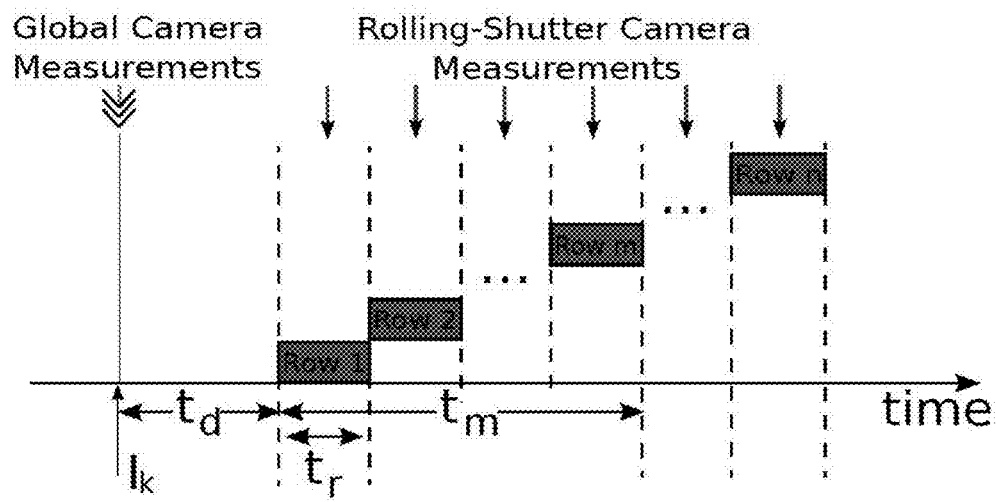
FIG. 2 is a graph illustrating example time synchronization and rolling-shutter effects.

FIG. 2 is a graph illustrating the time synchronization and rolling-shutter effect. As depicted in FIG. 2, both the time delay of the camera, as well as the rolling-shutter effect can be represented by a single time offset, corresponding to each row of pixels. For a pixel measurement in the m-th row of the image, the time difference can be written as: $t = t_d + t_m$.

Ignoring such time delays can lead to significant performance degradation. To address this problem, the proposed techniques introduce a measurement model that approximates the pose corresponding to a particular set of camera (image source) measurement as a linear interpolation (or extrapolation, if necessary) of the closest (in time) IMU poses, among the ones that comprise the estimator's optimization window.

Figure 3A:
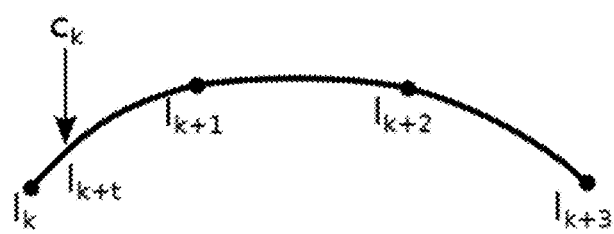
FIGS. 3A and 3B are graphs that illustrate an example cell phone's trajectory between poses.
Figure 3B:
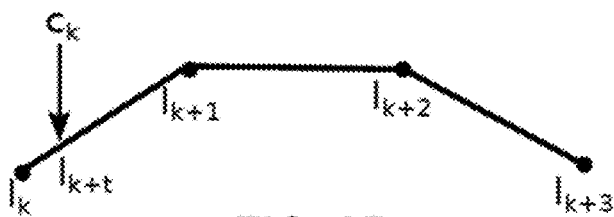

FIGS. 3A and 3B are graphs that illustrate an example of a cell phone's trajectory between poses $I_k$ and $I_{k+3}$. The camera measurement, $C_k$, is recorded at the time instant k+t between poses $I_k$ and $I_{k+1}$. FIG. 3A shows the real cell phone trajectory. FIG. 3B shows the cell phone trajectory with linear approximation in accordance with the techniques described herein.

An interpolation-based measurement model is proposed for expressing the pose, $I_{k+t}$ corresponding to image $C_k$ (see FIG. 3A), as a function of the poses comprising the estimator's optimization window. Several methods exist for approximating a 3D trajectory as a polynomial function of time, such as the Spline method. Rather than using a high-order polynomial, a linear interpolation model is employed in the examples described herein. Such a choice is motivated by the short time period between two consecutive poses, $I_k$ and $I_{k+1}$, that are adjacent to the pose $I_{k+t}$, which correspond to the recorded camera image. Although described with respect to linear interpolation, higher order interpolation can be employed, such as $2^{nd}$ or $3^{rd}$ order interpolation.

Specifically, defining $\{G\}$ as the global frame of reference and an interpolation ratio $\lambda_k \in [0, 1]$ (in this case, $\lambda_k$ is the distance between $I_k$ and $I_{k+t}$ over the distance between $I_k$ and $I_{k+1}$), the translation interpolation ${}^G P_{I_{k+t}}$ between two IMU positions ${}^G P_{I_k}$ and ${}^G P_{I_{k+1}}$ expressed in $\{G\}$, can be easily approximated as:

$${}^G P_{I_{k+t}} = (1-\lambda_k){}^G P_{I_k} + \lambda_k {}^G P_{I_{k+1}} \qquad (1)$$

In contrast, the interpolation of the frames' orientations is more complicated, due to the nonlinear representation of rotations. The proposed techniques takes advantage of two characteristics of the problem at hand for designing a simpler model: (i) The IMU pose is cloned at around 5 Hz (the same frequency as processing image measurements), thus the rotation between consecutive poses, $I_k$ and $I_{k+1}$, is small during regular motion. The stochastic cloning is intended to maintain past IMU poses in the sliding window of the estimator. (ii) IMU pose can be cloned at the time instant closest to the image's recording time, thus the interpolated pose $I_{k+t}$ is very close to the pose $I_k$ and the rotation between them is very small.

Exploiting (i), the rotation between the consecutive IMU orientations, described by the rotation matrices ${}_{1_k}^G C$ and ${}_{1_{k+1}}^G C$, respectively expressed in $\{G\}$, can be written as:

$${}_G^{I_{k+1}} C {}_{1_k}^k C = \cos \alpha I - \sin \alpha \lfloor \Theta \rfloor + (1-\cos \alpha)\Theta\Theta^T \approx I - \alpha \lfloor \Theta \rfloor \qquad (2)$$

where small-angle approximation is employed, $\lfloor \Theta \rfloor$ denotes the skew-symmetric matrix of the 3×1 rotation axis, $\Theta$, and $\alpha$ is the rotation angle. Similarly, according to (ii) the rotation interpolation ${}_{I_K}^{I_{k+1}} C$ between ${}_{1_k}^G C$ and ${}_{I_{k+1}}^G C$ can be written as:

$${}_{I_k}^{I_{k+1}} C = \cos(\lambda_k \alpha) I - \sin(\lambda_k \alpha)\lfloor \Theta \rfloor + (1-\cos(\lambda_k \alpha))\Theta\Theta^T \approx I - \lambda_k \alpha \lfloor \eta \rfloor \qquad (3)$$

If $\alpha\lfloor \Theta \rfloor$ from equations 2 and 3 is substituted, ${}_{1_k}^{I_{k+1}} C$ can be expressed in terms of two consecutive rotations:

$${}_{1_k}^{I_{k+1}} C \approx (1-\lambda_k) I + {}_G^{I_k} C {}_G^{I_{k+1}} C \qquad (4)$$

This interpolation model is exact at the two end points ($\Delta_k = 0$ or 1), and less accurate for points in the middle of the interpolation interval (i.e., the resulting rotation matrix does not belong to SO(3)). Since the cloned IMU poses can be placed as close as possible to the reported time of the image, such a model can fit the purposes of the desired application.

In one example, the proposed VINS 10 utilizes a rolling-shutter camera with a varying time offset. The goal is to estimate the 3D position and orientation of a device equipped with an IMU and a rolling-shutter camera. The measurement frequencies of both sensors are assumed known, while there exists an unknown time offset between the IMU and the camera timestamps. The proposed algorithm applies a linear-complexity (in the number of features tracked) visual-inertial odometry algorithm, initially designed for inertial and global shutter camera measurements that are perfectly time synchronized. Rather than maintaining a map of the environment, the estimator described herein may utilize Multi-State Constrained Kalman Filter (MSCKF) to marginalize all observed features, exploiting all available information for estimating a sliding window of past camera poses. Further techniques are described in U.S. patent application Ser. No. 12/383,371, entitled "VISION-AIDED INERTIAL NAVIGATION," the entire contents of which are incorporated herein by reference. The proposed techniques utilize a state vector, and system propagation uses inertial measurements. It also introduces the proposed measurement model and the corresponding EKF measurement update.

The state vector estimate is:

$$x = x_I x_{I_{k+n-1}} x_{I_k} \quad (5)$$

where $x_I$ denotes the current robot pose, and $x_{I_i}$, for $I=k+n-1, \ldots, k$ are the cloned IMU poses in the sliding window, corresponding to the time instants of the last n camera measurements. Specifically, the current robot pose is defined as:

$$x_I = [{}^I q_G^T \; {}^G v_I^T \; {}^G p_I^T \; b_a^T \; b_g^T \; \lambda_d \; \lambda_T]^T$$

where ${}^I q_G$ is the quaternion representation of the orientation of $\{G\}$ in the IMU's frame of reference $\{I\}$, ${}^G v_I$ and ${}^G p_I$ are the velocity and position of $\{I\}$ in $\{G\}$ respectively, while $b_a$ and $b_g$ correspond to the gyroscope and accelerometer biases. The interpolation ratio can be divided into a time-variant part, $\lambda_d$, and a time-invariant part, $\lambda_r$. In our case, $\lambda_d$ corresponds to the IMU-camera time offset, $t_d$, while $\lambda_r$ corresponds to the readout time of an image-row, $t_r$. Specifically, $$\lambda_d = \frac{t_d}{t_{intvl}} \quad \lambda_r = \frac{t_r}{t_{intvl}} \quad (6)$$

where $t_{intvl}$ is the time interval between two consecutive IMU poses (known). Then, the interpolation ratio for a pixel measurement in the m-th row of the image is written as:

$$\lambda = \lambda_d + m\lambda_r \quad (7)$$

When a new image measurement arrives, the IMU pose is cloned at the time instant closest to the image recording time. The cloned IMU poses $x_{I_i}$ defined as:

$$x_{I_i} = [{}^{I_i} q_G^T \; {}^G p_{I_i}^T \; \lambda_{d_i}]^T$$

where ${}^{I_i} q_G^T$, ${}^G p_{I_i}^T$, $\lambda_{d_i}$ are cloned at the time instant that the i-th image was recorded. Note, that $\lambda_{d_i}$ is also cloned because the time offset between the IMU and camera may change over time.

According to one case, for a system with a fixed number of cloned IMU poses, the size of the system's state vector depends on the dimension of each cloned IMU pose. In contrast to an approach proposed in Mingyang Li, Byung Hyung Kim, and Anastasios I. Mourikis. Real-time motion tracking on a cellphone using inertial sensing and a rolling-shutter camera. In Proc. of the IEEE International Conference on Robotics and Automation, pages 4697-4704, Karlsruhe, Germany, May 6-10 2013 (herein, "Li"), which requires to also clone the linear and rotational velocities, our interpolation-based measurement model reduces the dimension of the cloned state from 13 to 7. This smaller clone state size significant minimizes the algorithm's computational complexity.

When a new inertial measurement arrives, it is used to propagate the EKF state and covariance. The state and covariance propagation of the current robot pose and the cloned IMU poses are now described.

Current pose propagation: The continuous-time system model describing the time evolution of the states is:

$$
\begin{aligned}
{}^I\dot{q}_G(t) &= \frac{1}{2}\Omega(\omega_m(t) - b_g(t) - n_g(t)){}^I q_G(t) \\
{}^G\dot{v}_I(t) &= C({}^I q_G(t))^T (a_m(t) - b_a(t) - n_a(t)) + {}^G g \\
{}^G\dot{p}_I(t) &= {}^G v_I(t) \dot{b}_a(t) = n_{wa} \dot{b}_g(t) = n_{wg} \\
\dot{\lambda}_d(t) &= n_{td} \dot{\lambda}_r(t) = 0
\end{aligned}
\quad (8)
$$

where $C({}^I q_G(t))$ denotes the rotation matrix corresponding to ${}^I q_G(t)$, $\omega_m(t)$ and $\alpha_m(t)$ are the rotational velocity and linear acceleration measurements provided by the IMU, while $n_g$ and $n_\alpha$ are the corresponding white Gaussian measurement noise components. ${}^G g$ denotes the gravitational acceleration in $\{G\}$, while $n_{wa}$ and $n_{wg}$ are zero-mean white Gaussian noise processes driving the gyroscope and accelerometer biases $b_g$ and $b_\alpha$. $\Omega(\omega)$ is defined as $$\begin{bmatrix} -\lfloor \omega \rfloor & \omega \\ -\omega^2 & 0 \end{bmatrix}$$

Finally, $n_{td}$ is a zero-mean white Gaussian noise process modelling the random walk of $\lambda_d$ (corresponding to the time offset between the IMU and camera). For state propagation, the propagation is linearized around the current state estimate and the expectation operator is applied. For propagating the covariance, the error-state vector of the current robot pose is defined as:

$$\tilde{x} = [{}^I \delta\theta_G^T \; {}^G \tilde{v}_I^T \; {}^G \tilde{p}_I^T \; \tilde{b}_f^T \; \tilde{b}_a^T \; \tilde{b}_g^T \; \tilde{\lambda}_d^T \; \tilde{p}_r]^T \quad (9)$$

For quaternion q, a multiplicative error model $$\delta\bar{q} = \bar{q} \otimes \hat{\bar{q}}^{-1} \simeq \left[\frac{1}{2}\delta\Theta^T \; 1\right]^T$$

is employed, where $\delta\theta$ is a minimal representation of the attitude error.

Then, the linearized continuous-time error-state equation can be written as:

$$\dot{\tilde{x}} = F_E \tilde{x} + G_E w \quad (10)$$

where $w = [n_g^T \; n_{wg}^T \; n_a^T \; n_{wa}^T \; n_{td}]^T$ is modelled as a zero-mean white Gaussian process with auto-correlation $\mathbb{E}[w(t)w^T(\tau)] = Q_E \delta(1-\tau)$, and $F_E$, $G_E$ are the continuous time error-state transition and input noise matrices, respectively. The discrete-time state transition matrix $\Phi_{k+1,k}$ and the system covariance matrix $Q_k$ from time $t_k$ to $t_{k+1}$ can be computed as:

$$\Phi_{k+1,k} = \Phi(t_{k+1}, t_k) = \exp(\int_{t_k}^{t_{k+1}} F_{E(\tau)} d\tau)$$

$$Q_k = \int_{t_k}^{t_{k+1}} \Phi_{(t_{k+1},\tau)} G_E Q_E G_E^T \Phi_{(t_{k+1},\tau)}^T d\tau \quad (11)$$

If the covariance corresponding to the current pose is defined as $P_{EE_{k|k}}$, the propagated covariance $P_{EE_{k+1|k}}$ can be determined as $$P_{EE_{k+1|k}} = \Phi_{k+1,k} P_{EE_{k|k}} \Phi_{k+1,k}^T + Q_k \quad (12)$$

where $x_{k|l}$ denotes the estimate of x at time step k using measurements up to time step l.

During propagation, the state and covariance estimates of the cloned robot poses do not change, however their cross-correlations with the current IMU pose need to be propagated. If P is defined as the covariance matrix of the whole state x, $P_{CC_{k|k}}$ as the covariance matrix of the cloned poses, and $P_{EC_{k|k}}$ as the correlation matrix between the errors in the current pose and cloned poses, the system covariance matrix is propagated as:

$$P_{k+1|k} = \begin{bmatrix} P_{EE_{k+1|k}} & \Phi_k P_{EC_{k|k}} \\ P_{EC_{k|k}}^T \Phi_{k+1,k}^T & P_{CC_{k|k}} \end{bmatrix} \quad (13)$$

with $\Phi_{k+1,k}$ defined in equation 11.

Each time the camera records an image, a stochastic clone comprising the IMU pose, $^I q_G$, $^G p_I$, and the interpolation ratio, $\lambda_d$, describing its time offset from the image, is created. This process enables the MSC-KF to utilize delayed image measurements; in particular, it allows all observations of a given feature $f_j$ to be processed during a single update step (when the first pose that observed $f_j$ is about to be marginalized), while avoiding to maintain estimates of this feature, in the state vector.

For a feature $f_j$ observed in the m-th row of the image associated with the IMU pose $I_k$, the interpolation ratio can be expressed as $\lambda_k = \lambda_{dk} + m\Delta_r$ where $\lambda_{d_k}$ is the interpolation ratio corresponding to the time offset between the clocks of the two sensors at time step k, and $m\lambda_T$ is the contribution from the rolling-shutter effect. The corresponding measurement model is given by:

$$z_k^{(j)} = h(^{I_{k+t}} p_{fj}) + n_k^{(j)}, n_k^{(j)} \sim N(0, R_{k,j}) \quad (14)$$

where $^{I_{k+t}} p_{fj}$ is the feature position expressed in the camera frame of reference at the exact time instant that the m-th image-row was read. Without loss of generality, it is assumed that the camera is intrinsically calibrated with the camera perspective measurement model, h, described by:

$$h(^{I_{k+t}} p_{fj}) = \begin{bmatrix} \frac{^{I_{k+t}} p_{fj}(1)}{^{I_{k+t}} p_{fj}(3)} \\ \frac{^{I_{k+t}} p_{fj}(2)}{^{I_{k+t}} p_{fj}(3)} \end{bmatrix} \quad (15)$$

where $^{I_{k+t}} p_{fj}(i)$, i=1, 2, 3 represents the i-th element of $^{I_{k+t}} p_{fj}$. Expressing $^{I_{k+t}} p_{fj}$ as a function of the states that is estimated, results in:

$$^{I_{k+t}} p_{fj} = ^{I_{k+t}}_G C(^G p_{fj} - ^G p_{I_{k+t}}) = ^{I_{k+t}}_{I_k} C^{I_k}_G C(^G p_{fj} - ^G p_{I_{k+t}}) \quad (16)$$

Substituting $^{I_{k+t}}_{I_k} C$ and $^G p_{I_{k+t}}$, from equations 4 and 1, equation 16 can be rewritten as:

$$^{I_{k+t}} p_{fj} = ((1-\lambda_k)I + \lambda_k {^{I_k}_G C}{^{I_{k+1}}_G C^T}) {^{I_k}_G C}$$

$$(^G p_{fj} - ((1-\lambda_k) ^G p_{I_k} + \lambda_k ^G p_{I_{k+1}})) \quad (17)$$

Linearizing the measurement model about the filter estimates, the residual corresponding to this measurement can be computed as $$r_k^{(j)} = z_k^{(j)} - h(^{I_{k+t}} \hat{p}_{fj}) \quad (18)$$

$$\simeq H_{x_{I_k}}^{(j)} \tilde{x}_{I_k} + H_{x_{I_{k+1}}}^{(j)} \tilde{x}_{I_{k+1}} + H_{f_j}^{(j)G} \tilde{p}_{fj} + H_{\lambda_{r_k}}^{(j)} \tilde{\lambda}_r + n_k^{(j)}$$

where $$H_{x_{I_k}}^{(j)}, H_{x_{I_{k+1}}}^{(j)}, H_{f_j}^{(j)}, \text{ and } H_{\lambda_{r_k}}^{(j)}$$

are the Jacobians with respect to the cloned poses $x_{I_k}$, $x_{I_{k+1}}$, the feature position $^G p_{fj}$, and the interpolation ratio corresponding to the image-row readout time, $\lambda_T$, respectively.

By stacking the measurement residuals corresponding to the same point feature, $f_j$:

$$r^{(j)} = \begin{bmatrix} r_k^{(j)} \\ \vdots \\ r_{k+n-1}^{(j)} \end{bmatrix} \simeq H_{x_{clone}}^{(j)} \tilde{x}_{clone} + H_f^{(j)G} \tilde{p}_{fj} + H_{\lambda_r}^{(j)} \tilde{\lambda}_r + n^{(j)} \quad (19)$$

where $\tilde{X}_{clone} = [\tilde{X}_{I_{k+n-1}}^T \ldots \tilde{X}_{I_k}^T]^T$ is the error in the cloned pose estimates, while $H_{x_j}^{(j)}$ is the corresponding Jacobian matrix. Furthermore, $H_f^{(j)}$ and $H_{\lambda_r}^{(j)}$ are the Jacobians corresponding to the feature and interpolation ratio contributed by the readout time error, respectively.

To avoid including feature $f_j$ in the state vector, the error term is marginalized $^G \tilde{p}_{fj}$ by multiplying both sides of equation 19 with the left nullspace, V, of the feature's Jacobian matrix $H_f^{(j)}$, i.e., $$r_o^{(j)} \simeq V^T H_{x_{clone}}^{(j)} \tilde{x}_{clone} + V^T H_f^{(j)G} \tilde{p}_{fj} + V^T H_{\lambda_r}^{(j)} \tilde{\lambda}_r + V^T n^{(j)} \quad (20)$$

$$\triangleq H_o^{(j)} \tilde{x} + n_o^{(j)}$$

where $r_o^{(j)} \triangleq V^T r^{(j)}$. Note V does not have to be computed explicitly. Instead, this operation can be applied efficiently using in-place Givens rotations.

Previously, the measurement model for each individual feature was formulated. Specifically, the time-misaligned camera measurements was compensated for with the interpolation ratio corresponding to both the time offset between sensors and the rolling shutter effect. Additionally, dependence of the measurement model on the feature positions was removed. EKF updates are made using all the available measurements from L features.

Stacking measurements of the form in equation 2, originating from all features, $f_j$, j=1, ..., L, yields the residual vector:

$$r \simeq H\tilde{x} + n \quad (21)$$

where H is a matrix with block rows the Jacobians $H_o^{(j)}$, while r and n are the corresponding residual and noise vectors, respectively.

In practice, H is a tall matrix. The computational cost can be reduced by employing the QR decomposition of H denoted as:

$$H = [Q_1 \ Q_2] \begin{bmatrix} R_H \\ 0 \end{bmatrix} \qquad (22)$$

where $[Q_1 \ Q_2]$ is an orthonormal matrix, and $R_H$ is an upper triangular matrix. Then, the transpose of $[Q_1 \ Q_2]$ can be multiplied to both sides of equation 21 to obtain:

$$\begin{bmatrix} Q_1^T \ r \\ Q_2^T \ r \end{bmatrix} = \begin{bmatrix} R_H \\ 0 \end{bmatrix} \tilde{x} + \begin{bmatrix} Q_1^T \ n \\ Q_2^T \ n \end{bmatrix} \qquad (23)$$

It is clear that all information related to the error in the state estimate is included in the first block row, while the residual in the second block row corresponds to noise and can be completely discarded. Therefore, first block row of equation 23 is needed as residual for the EKF update:

$$r_n = Q_1^T r = R_H \tilde{x} + Q_1^T n \qquad (24)$$

The Kalman gain is computed as:

$$K = P R_H^T (R_H P R_H^T + R)^{-1} \qquad (25)$$

where R is the measurement noise. If the covariance of the noise n is defined as $\sigma^2 I$, then $R = \sigma^2 Q_1^T Q_1 = \sigma^2 I$. Finally, the state and covariance updates are determined as:

$$x_{k+1|k+1} = x_{k+1|k} + K r_n \qquad (26)$$

$$P_{k+1|k+1} = P - P R_H^T (R_H P R_H^T + R)^{-1} R_H P \qquad (27)$$

Defining the dimension of H to be m×n, the computational complexity for the measurement compression QR in equation 22 will be $$O\left(2mn^2 - \frac{2}{3}n^3\right),$$

and roughly $O(n^3)$ for matrix multiplications or inversions in equations 25 and 26. Since H is a very tall matrix, and m is, typically, much larger than n, the main computational cost of the MSC-KF corresponds to the measurement compression QR. It is important to note that the number of columns n depends not only on the number of cloned poses, but also on the dimension of each clone.

For the proposed approach this would correspond to 7 states per clone (i.e., 6 for the camera pose, and a scalar parameter representing the time-synchronization). In contrast, one recent method proposed in Mingyang Li, Byung Hyung Kim, and Anastasios I. Mourikis. Real-time motion tracking on a cellphone using inertial sensing and a rolling-shutter camera. In Proc. of the IEEE International Conference on Robotics and Automation, pages 4697-4704, Karlsruhe, Germany, May 6-10 2013 (herein "Li") requires 13 states per clone (i.e., 6 for the camera pose, 6 for its corresponding rotational and linear velocities, and a scalar parameter representing the time-synchronization). This difference results in a 3-fold computational speedup compared to techniques in Li, for this particular step of an MSCKF update. Furthermore, since the dimension of the system is reduced to almost half through the proposed interpolation model, all the operations in the EKF update will also gain a significant speedup. Li's approach requires the inclusion of the linear and rotational velocities in each of the clones in order to be able to fully compute (update) each clone in the state vector. In contrast, the techniques described are able to exclude storing the linear and rotational velocities for each IMU clone, thus leading to a reduced size for each clone in the state vector, because linear interpolation is used to express the camera feature measurement as a function of two or more IMU clones (or camera poses) already in the state vector. Alternatively, image source clones could be maintained within the state vector, and poses for the IMU at time stamps when IMU data is received could be similarly determined as interpolations from surrounding (in time) camera poses, i.e., interpolation is used to express the IMU feature measurement as a function of two or more cloned camera poses already in the state vector Linearization error may cause the EKF to be inconsistent, thus also adversely affecting the estimation accuracy. This may be addressed by employing the OC-EKF.

A system's unobservable directions, N, span the nullspace of the system's observability matrix M:

$$MN = 0 \qquad (28)$$

where by defining $101_{k,1} \triangleq \Phi_{k,k-1} \ldots \Phi_{2,1}$ as the state transition matrix from time step 1 to k, and $H_k$ as the measurement Jacobian at time step k, M can be expressed as:

$$M = \begin{bmatrix} H_1 \\ H_2 \Phi_{2,1} \\ \vdots \\ H_k \Phi_{k,1} \end{bmatrix} \qquad (29)$$

However, when the system is linearized using the current estimate in equation 28, in general, does not hold. This means the estimator gains spurious information along unobservable directions and becomes inconsistent. To address this problem, the OC-EKF enforces equation 28 by modifying the state transition and measurement Jacobian matrices according to the following two observability constraints:

$$N_{k+1} = \Phi_{k+1,k} N_k \qquad (30)$$

$$H_k N_k = 0, \ \forall k > 0 \qquad (31)$$

where $N_k$ and $N_{k+1}$ are the system's unobservable directions evaluated at time-steps k and k+1. This method will be applied to this system to appropriately modify $\Phi_{k+1,k}$, as defined in equation 11, and $H_k$, and thus retain the system's observability properties.

In one embodiment, it is shown that the inertial navigation system aided by time-aligned global-shutter camera has four unobservable directions: one corresponding to rotations about the gravity vector, and three to a global translations. Specifically, the system's unobservable directions with respect to the IMU pose and feature position, $[^I q_g^T \ b_g^T \ {^G v_I^T} \ b_a^T \ {^G p_I^T} \ {^G p_f^T}]^T$, can be written as:

$$N \triangleq \begin{bmatrix} ^I_G C g & 0_{3 \times 3} \\ 0_{3 \times 1} & 0_{3 \times 3} \\ -\lfloor ^G v \rfloor g & 0_{3 \times 3} \\ 0_{3 \times 1} & 0_{3 \times 3} \\ -\lfloor ^G p_I \rfloor g & I_{3 \times 3} \\ -\lfloor ^G p_f \rfloor g & I_{3 \times 3} \end{bmatrix} = \begin{bmatrix} N_r \\ N_f \end{bmatrix} \qquad (32)$$

Once system's unobservable directions have been determined, the state transition matrix, $\Phi_{k+1,k}$, can be modified according to the observability constant in equation 30.

$$N_{r_{k+1}} = \Phi_{k+1,k} N_{r_k} \qquad (33)$$

where $\Phi_{k+1,k}$ has the following structure:

$$\begin{bmatrix} \Phi_{11} & \Phi_{12} & 0_3 & 0_3 & 0_3 \\ 0_3 & I_3 & 0_3 & 0_3 & 0_3 \\ \Phi_{31} & \Phi_{32} & I_3 & \Phi_{34} & 0_3 \\ 0_3 & 0_3 & 0_3 & I_3 & 0_3 \\ \Phi_{51} & \Phi_{52} & \delta t I_3 & \Phi_{54} & I_3 \end{bmatrix} \quad (34)$$

Equation 33 is equivalent to the following three constraints:

$$\Phi_{11} {}^{I_k}_G Cg = {}^{I_{k+1}}_G Cg \quad (35)$$

$$\Phi_{31} {}^{I_k}_G Cg = \lfloor {}^G v_{I_k} \rfloor g - \lfloor {}^G v_{I_{k+1}} \rfloor g \quad (36)$$

$$\Phi_{51} {}^{I_k}_G Cg = \delta t \lfloor {}^G v_{I_k} \rfloor g + \lfloor {}^G p_{I_k} \rfloor g - \lfloor {}^G p_{I_{k+1}} \rfloor g \quad (37)$$

in which equation 35 can be easily satisfied by modifying $\Phi^*_{11} = {}^{I_{k+1}}_G C {}^{I_k}_G C^T$.

Both equations 36 and 37 are in the form $Au=w$, where $u$ and $w$ are fixed. This disclosure seeks to select another matrix $A^*$ that is closest to the $A$ in the Frobenius norm sense, while satisfying constraints 36 and 37. To do so, the following optimization problem is formulated $$A^* = \mathrm{argmin} \, \|A^* - A\|_\mathcal{F}^2 \; A^* \; \mathrm{s.t.} \; A^*u = w \quad (38)$$

where $\|\cdot\|_F$ denotes the Frobenius matrix norm. The optimal $A^*$ can be determined by solving its KKT optimality condition, whose solution is $$A^* = A - (Au-w)(u^T u)^{-1} u^T \quad (39)$$

During the update at time step k, the nonzero elements of the measurement Jacobian $H_k$, as shown in equation 18, are $$\begin{bmatrix} H_{I_k q_G} & H_{G p_{I_k}} & H_{I_{k+1} q_G} & H_{G p_{I_{k+1}}} & H_{G p_f} & H_{\lambda_r} \end{bmatrix},$$

corresponding to the elements of the state vector involved in the measurement model (as expressed by the subscript).

Since two IMU poses are involved in the interpolation-based measurement model, the system's unobservable directions, at time step k, can be shown to be:

$$N'_k \triangleq [N_{r_k}^T N_{r_{k+1}}^T N_{f_k}^T 0]^T \quad (40)$$

where $N_{r_i}$, i=k, k+1, and $N_{f_k}$ are defined in (32), while the zero corresponds to the interpolation ratio. This can be achieved straightforwardly by finding the nullspace of the linearized system's Jacobian. If $N'^f_k \triangleq [N^g_k \; N^p_k]$, where $N^g_k$ is the first column of $N'_k$ corresponding to the rotation about the gravity, and $N^p_k$ is the other three columns corresponding to global translations, then according to equation 31, $H_k$ is modified to fulfill the following two constraints:

$$H_k N^p_k = 0 \Leftrightarrow H_{G p_{I_k}} + H_{G p_f} = 0 \quad (41)$$

$$H_k N^g_k = 0 \Leftrightarrow \begin{bmatrix} H_{I_k q_G} & H_{G p_{I_k}} & H_{I_{k+1} q_G} & H_{G p_{I_{k+1}}} & H_{G p_f} \end{bmatrix} \quad (42)$$

$$\begin{bmatrix} {}^{I_k}_G Cg \\ -\lfloor {}^G p_{I_k} \rfloor g \\ {}^{I_{k+1}}_G Cg \\ -\lfloor {}^G p_{I_{k+1}} \rfloor g \\ -\lfloor {}^G p_f \rfloor g \end{bmatrix} = 0$$

Substituting $$H_{G p_f}$$

from equations 41 and 42, the observability constraint for the measurement Jacobian matrix is written as:

$$\begin{bmatrix} H_{I_k q_G} & H_{G p_{I_k}} & H_{I_{k+1} q_G} & H_{G p_{I_{k+1}}} \end{bmatrix} \begin{bmatrix} {}^{I_k}_G Cg \\ (\lfloor {}^G p_f \rfloor - \lfloor {}^G p_{I_k} \rfloor) g \\ {}^{I_{k+1}}_G Cg \\ (\lfloor {}^G p_f \rfloor - \lfloor {}^G p_{I_{k+1}} \rfloor) g \end{bmatrix} = 0 \quad (43)$$

which is of the form $Au=0$. Therefore, $$H^*_{I_k q_G}, H^*_{G p_{I_k}}, H^*_{I_{k+1} q_G}, \text{ and } H^*_{G p_{I_{k+1}}}$$

can be analytically determined using equations 38 and 39, for the special case when w=0. Finally according to equation 41, $$H^*_{G p_f} = -H^*_{G p_{I_k}} - H^*_{G p_{I_{k+1}}}.$$

The simulations involved a MEMS-quality IMU, as well as a rolling-shutter camera with a readout time of 30 msec. The time offset between the camera and the IMU clock was modelled as a random walk with mean 3.0 msec and standard deviation 1.0 msec. The IMU provided measurements at a frequency of 100 Hz, while the camera ran at 10 Hz. The sliding-window state contained 6 cloned IMU poses, while 20 features were processed during each EKF update.

The following variants of the MSC-KF were compared:
Proposed: The proposed OC-MSC-KF, employing an interpolation-based measurement model.
w/o OC: The proposed interpolation-based MSC-KF without using OC-EKF.
Li: An algorithm described in Mingyang Li, Byung Hyung Kim, and Anastasios I. Mourikis, *Real-time motion tracking on a cellphone using inertial sensing and a rolling-shutter camera*, In Proc. of the IEEE International Conference on Robotics and Automation, pages 4697-4704, Karlsruhe, Germany, May 6-10 2013 (herein, "Li") that uses a constant velocity model, and thus also clones the corresponding linear and rotational velocities, besides the cell phone pose, in the state vector.

Figure 4A:
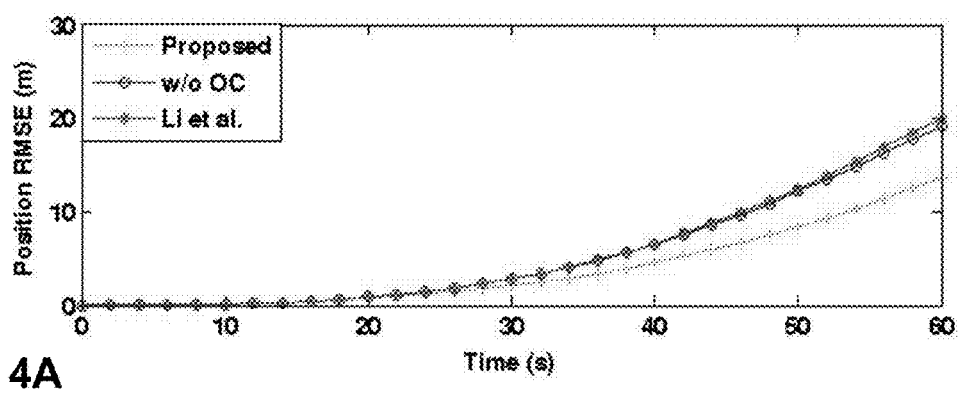
FIGS. 4A and 4B are graphs plotting Monte-Carlo simulations comparing: (a) Position RMSE (b) Orientation root-mean square errors (RMSE), over 20 simulated runs.
Figure 4B:
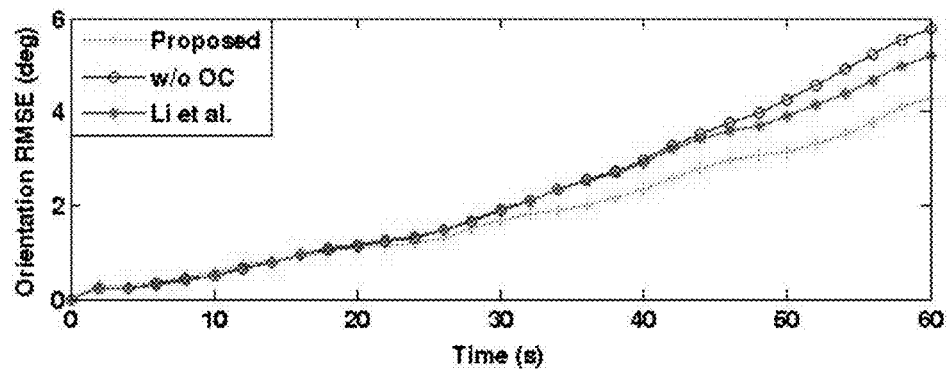

The estimated position and orientation root-mean square errors (RMSE) are plotted in FIGS. 4A and 4B, respectively. By comparing Proposed and w/o OC, it is evident that employing the OC-EKF improves the position and orientation estimates. Furthermore, the proposed techniques achieves lower RMSE compared to Li, at a significantly lower computational cost.

In addition to simulations, the performance of the proposed algorithm was validated using a Samsung S4 mobile phone. The S4 was equipped with 3-axial gyroscopes and accelerometers, a rolling-shutter camera, and a 1.6 GHz quad-core Cortex-A15 ARM CPU. Camera measurements were acquired at a frequency of 15 Hz, while point features were tracked across different images via an existing algorithm. For every 230 ms or 20 cm of displacement, new Harris corners were extracted while the corresponding IMU pose was inserted in the sliding window of 10 poses, maintained by the filter. The readout time for an image was about 30 ms, and the time offset between the IMU and camera clocks was approximately 10 ms. All image-processing algorithms were optimized using an ARM NEON assembly. The developed system required no initial calibration of the IMU biases, rolling-shutter time, or camera-IMU clock offset, as these parameters were estimated online. Since no high-precision ground truth is available, in the end of the experiments, the cell phone was brought back to the initial position and this allowed for examination of any final position error.

Figure 5A:
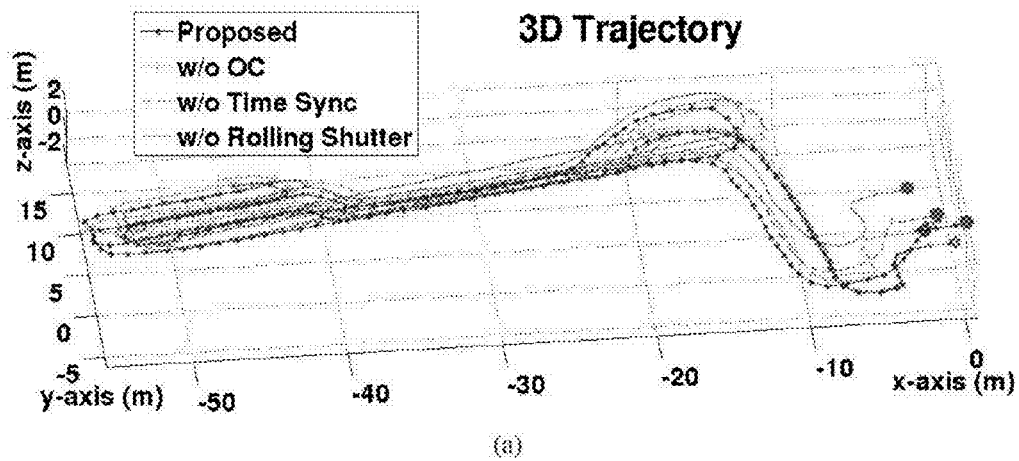
FIGS. 5A and 5B are graphs illustrating experimental results.
Figure 5B:
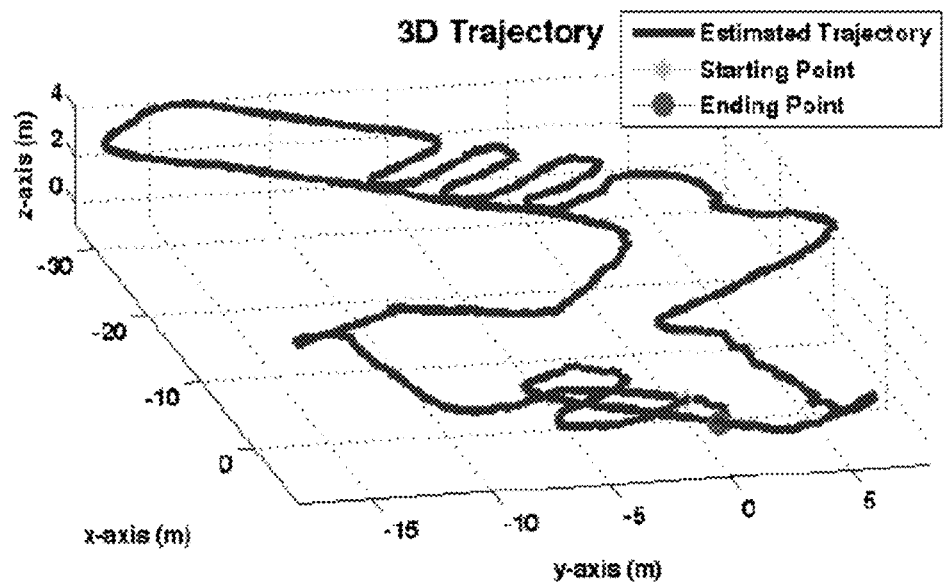

Two experiments were performed. The first, as shown in FIG. 5A, served the purpose of demonstrating the impact of not employing the OC-EKF or ignoring the time synchronization and rolling shutter effects, while the second, as shown in FIG. 5B, demonstrates the performance of the developed system, during an online experiment.

The first experiment comprises a loop of 277 meters, with an average velocity of 1.5 msec. The final position errors of Proposed, w/o OC, and the following two algorithms are examined:

w/o Time Sync: The proposed interpolation-based OC-MSC-KF considering only the rolling shutter, but not the time synchronization.

w/o Rolling Shutter: The proposed interpolation-based OC-MSC-KF considering only the time synchronization, but not the rolling shutter.

The 3D trajectories of the cell phone estimated by the above algorithms are plotted in FIG. 5A, and their final position errors are reported in Table. I.

TABLE I

LOOP CLOSURE ERRORS

| Estimation Algorithm | Final Error (m) | Pct. (%) |
|---|---|---|
| Proposed | 1.64 | 0.59 |
| w/o OC | 2.16 | 0.79 |
| w/o Time Sync | 2.46 | 0.91 |
| w/o Rolling Shutter | 5.02 | 1.88 |

Several key observations can be made. First, by utilizing the OC-EKF, the position estimation error decreases significantly (from 0:79% to 0:59%). Second, even a (relatively small) unmodeled time offset of 10 msec between the IMU and the camera clocks, results in an increase of the loop closure error from 0:59% to 0:91%. In practice, with about 50 msec of an unmodelled time offset, the filter will diverge immediately. Third, by ignoring the rolling shutter effect, the estimation accuracy drops dramatically, since during the readout time of an image (about 30 msec), the cell phone can move even 4.5 cm, which for a scene at 3 meters from the camera, corresponds to a 2 pixel measurement noise. Finally, both the rolling shutter and the time synchronization were ignored in which case the filter diverged immediately.

In the second experiment, estimation was performed online. During the trial, the cell phone traversed a path of 231 meters across two floors of a building, with an average velocity of 1.2 msec. This trajectory included both crowded areas and featureless scenes. The final position error was 1.8 meters, corresponding to 0.8% of the total distance traveled (see FIG. 5B).

In order to experimentally validate the computational gains of the proposed method versus existing approaches for online time synchronization and rolling-shutter calibration, which require augmenting the state vector with the velocities of each clone, the QR decomposition of the measurement compression step in the MSC-KF for the two measurement models were compared for the various models. Care was taken to create a representative comparison. The QR decomposition algorithm provided was used by the C++ linear algebra library Eigen, on Samsung S4. The time to perform this QR decomposition was recorded for various numbers of cloned poses, M, observing measurements of 50 features.

Figure 6:
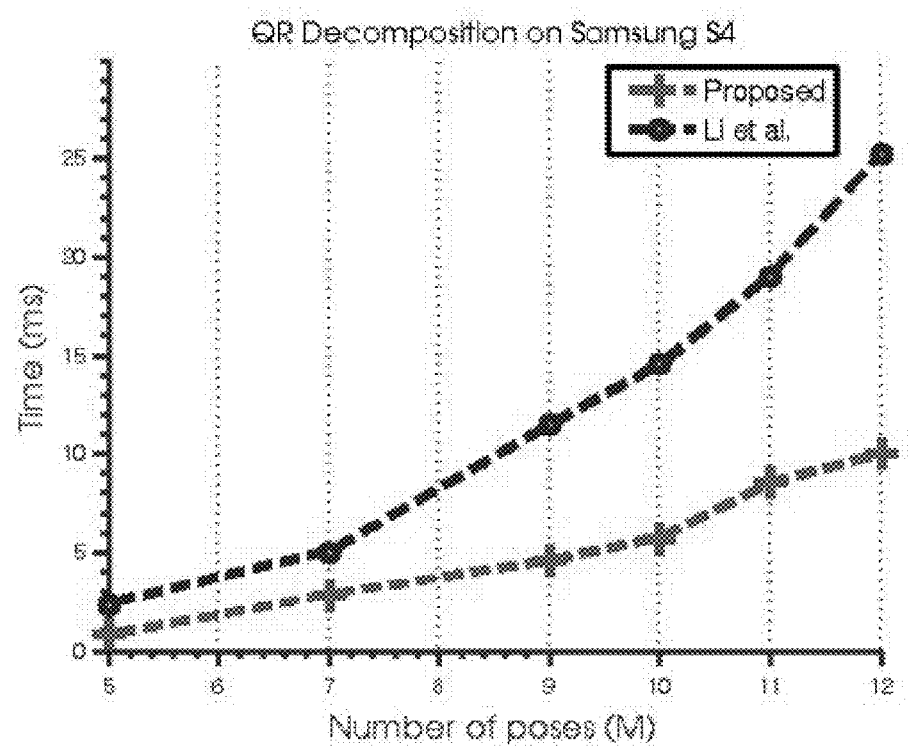
FIG. 6 is a graph illustrating a computational time comparison for the measurement compression QR, employed in the MSC-KF between the proposed measurement model and a conventional method.

Similar to both algorithms, a Jacobian matrix with 50(2M−3) rows was considered. However, the number of columns differs significantly between the two methods. As expected, based on the computational cost of the QR factorization, $O(mn^2)$ for a matrix of size m×n the proposed method leads to significant computational gains. As demonstrated in FIG. 6, the techniques described herein may utilize a QR factorization that is 3 times faster compared to the one described in Mingyang Li, Byung Hyung Kim, and Anastasios I. Mourikis, *Real-time motion tracking on a cellphone using inertial sensing and a rolling-shutter camera*, In Proc. of the IEEE International Conference on Robotics and Automation, pages 4697-4704, Karlsruhe, Germany, May 6-10 2013.

Furthermore, since the dimension of the system is reduced to almost half through the proposed interpolation model, all the operations in the EKF update will also gain a significant speedup (i.e., a factor of 4 for the covariance update, and a factor of 2 for the number of Jacobians evaluated). Such speed up on a cell phone, which has very limited processing resources and battery, provides additional benefits, because it both allows other applications to run concurrently, and extends the phone's operating time substantially.

Figure 7:
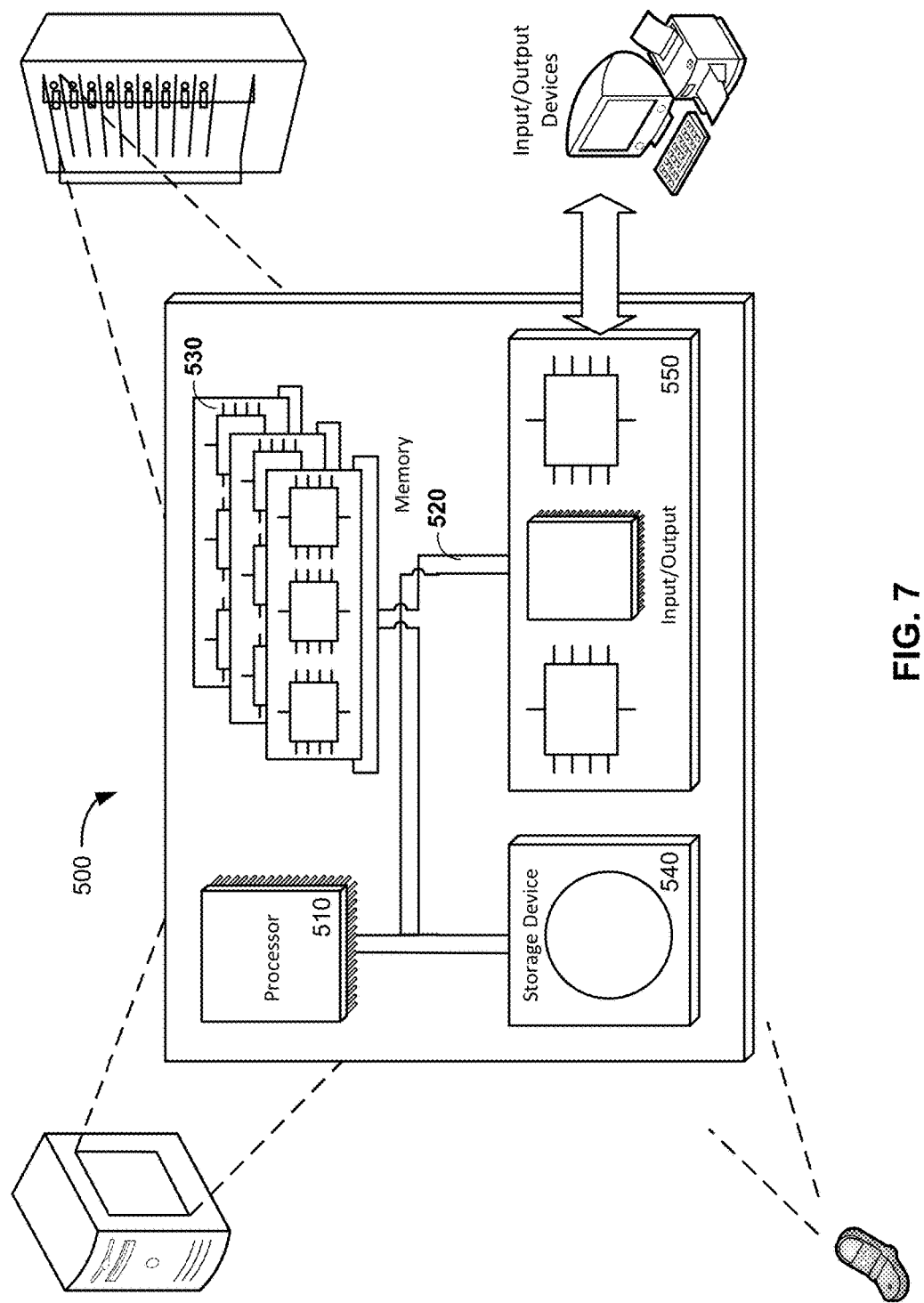
FIG. 7 shows a detailed example of various devices that may be configured to implement some embodiments in accordance with the current disclosure.

FIG. 7 shows a detailed example of various devices that may be configured as a VINS to implement some embodiments in accordance with the current disclosure. For example, device 500 may be a mobile sensing platform, a mobile phone, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation system.

In this example, a computer 500 includes a hardware-based processor 510 that is operable to execute program instructions or software, causing the computer to perform various methods or tasks, such as performing the enhanced estimation techniques described herein. Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments of the invention have been described. These and other embodiments are within the scope of the following claims.

The invention claimed is:

1. A vision-aided inertial navigation system (VINS) comprising:
    an image source configured to produce image data at a first set of time instances along a trajectory within a three-dimensional (3D) environment, wherein the image data captures feature observations within the 3D environment at each of the first set of time instances;
    an inertial measurement unit (IMU) configured to produce IMU data for the VINS along the trajectory at a second set of time instances that is misaligned in time with the first set of time instances, wherein the IMU data indicates a motion of the VINS along the trajectory; and
    a processing unit comprising an estimator configured to process the IMU data and the image data to compute state estimates for poses of the IMU at each of the first set of time instances and poses of the image source at each of the second set of time instances along the trajectory,
    wherein the estimator is configured to compute each of the poses for the image source as an interpolation from a subset of the poses for the IMU along the trajectory.

2. The vision-aided inertial navigation system of claim 1, wherein the estimator is configured to compute each of the poses for the image source as linear interpolation or as a higher order interpolation from the subset of the poses for the IMU along the trajectory.

3. The vision-aided inertial navigation system of claim 1,
    wherein the poses of the IMU and poses of the image source are computed as positions and 3D orientations at each of the second set of time instances along the trajectory, and
    wherein the estimator is configured to compute state estimates for a position, orientation and velocity of the VINS.

4. The vision-aided inertial navigation system of claim 1,
    wherein the estimator is configured to store a sliding window of the poses computed for the IMU along the trajectory, and
    wherein, when computing each of the poses for the image source, the estimator selects the poses for the IMU that are adjacent in the sliding window and that have time instances closest to the time instance for the pose being computed for the image source, and computes the respective poses for the image source as an interpolation of the selected poses for the IMU.

5. The vision-aided inertial navigation system of claim 1,
    wherein the estimator is configured to compute estimated positions for features observed within the environment at each of the second set of time instances, and
    wherein, for each of the second set of time instances, the estimator is configured to compute the positions for the features by applying an interpolation ratio to the subset of poses for the IMU that were used to compute the pose for the image source at that time instance.

6. The vision-aided inertial navigation system of claim 1, wherein, for each of poses for the image source, the interpolation ratio represents a ratio of the distances along the trajectory from the pose of the image source to the subset of the poses for the IMU used to compute the pose for the image source.

7. The vision-aided inertial navigation system of claim 1, wherein the estimator is configured to build a map of the environment.

8. The vision-aided inertial navigation system of claim 1, wherein the image source comprises at least one sensor having a plurality of rows of image data,
wherein the sensor reads the plurality of rows of image data row-by-row so that each of the rows are read at a different one of the first time instance, and
wherein, when computing the poses, the estimator is configured to compute a different one of the poses for the image source for each of the rows of the image data using a different interpolation ratio.

9. The vision-aided inertial navigation system of claim 1, wherein the estimator is configured to compute each of the poses for the image source by storing and updating a state vector having a sliding window of poses for the image source, each of the poses for the image source corresponding to a different one of the first set of time instances at which image data was received from the image source, and
wherein, responsive to the image source producing image data, the estimator is configured to clone a most recent pose computed for the IMU and inserts the cloned pose into the state vector as an image source pose having six dimensions for the image source and a scalar representing a time offset for the time at which the image data was received and excluding state estimates for linear and rotational velocities.

10. The vision-aided inertial navigation system of claim 9, wherein each of clones of the IMU pose $x_{I_i}$ is represented in the state vector as:

$$x_{I_i} = [^{I_i}q_G^T \, {}^G p_{I_i}^T \, \lambda_{d_i}]^T$$

where $^{I_i}q_G^T$, $^G p_{I_i}^T$, $\lambda_{d_i}$ are cloned at the time instant that the i-th image data was recorded.

11. The vision-aided inertial navigation system of claim 9, wherein estimator represents the state vector estimate as:

$$X = [x_I \, x_{I_{k+n-1}} \ldots x_{I_k}],$$

where $x_I$ denotes a current pose for the image source, and $x_{I_i}$, for I=k+n-1, ..., k are the cloned IMU poses in the sliding window, corresponding to the time instants of the last n camera measurements, and
wherein the current pose for the image source comprises:

$$x_I = [^I q_G^T \, {}^G v_I^T \, {}^G p_I^T \, b_a^T \, b_g^T \, \lambda_d \, \lambda_r]^T,$$

where $^I q_G$ is the quaternion representation of the orientation of a global frame of reference in the IMU's frame of reference, $^G v_I$ and $^G p_I$ are the velocity and position of a frame of reference for the IMU in the global frame of reference respectively, while $b_a$ and $b_g$ correspond to gyroscope and accelerometer biases for the IMU.

12. The vision-aided inertial navigation system of claim 1, wherein the vision-aided inertial navigation system is integrated within a mobile phone or a robot.

13. The vision-aided inertial navigation system of claim 1, wherein the first set of time instances and the second set of time instances are offset in time by an amount.

14. A method for computing state estimates for a vision-aided inertial navigation system (VINS) comprising:
receiving image data associated with each of a first set of time instances along a trajectory within a three-dimensional (3D) environment, wherein the image data captures features within the 3D environment at each of the first set of time instances time instances;
receiving, from an inertial measurement unit (IMU), IMU data indicative of a motion of the VINS along the trajectory at a second set of time instances that is misaligned in time with the first set of time instances; and
processing the IMU data and the image data to compute state estimates for poses of the IMU at each of the first set of time instances and poses of the image source at each of the second set of time instances along the trajectory,
wherein each of the poses for the image source is computed as a linear interpolation from a subset of the poses for the IMU along the trajectory.

15. The method of claim 14, wherein computing each of the poses for the image source comprises applying a linear interpolation or a higher order interpolation from the subset of the poses for the IMU along the trajectory.

16. The method of claim 14, wherein the poses of the IMU and poses of the image source are computed as positions and 3D orientations at each of the second set of time instances along the trajectory.

17. The method in claim 14, further comprising:
storing a sliding window of the poses previously computed for the IMU; and
selecting the subset of the poses from the sliding window.

18. The method in claim 14, further comprising
for each of the second set of time instances, computing positions for features within the environment by applying an interpolation ratio to the subset of poses for the IMU that were used to compute the pose for the image source at that time instance.

19. The method in claim 18, wherein, for each of poses for the image source, the interpolation ratio represents a ratio of the distances along the trajectory from the pose of the image source to the subset of the poses for the IMU used to compute the pose for the image source.

20. The method of claim 14, further comprising constructing a map of the environment to include the state estimates of the VINS.

21. The method of claim 14, wherein the first set of time instances and the second set of time instances are offset in time by an amount.

22. The method of claim 14, wherein computing each of the poses for the image source comprises:
maintaining a state vector having a sliding window of poses for the image source, each of the poses for the image source corresponding to a different one of the first set of time instances at which image data was received from the image source;
responsive to the image source producing data, cloning a most recent pose computed for the IMU and inserts the cloned pose into the state vector, wherein the cloned pose includes six dimensions for the image source and a scalar representing a time offset for the time at which the image data was received, and wherein the cloned pose excludes state estimates for linear and rotational velocities; and
updating, upon receiving IMU data from the IMU source, each of the poses within the state vector.

23. A non-transitory computer-readable storage device comprising program code to cause a processor to:
receive image data associated with each of a first set of time instances along a trajectory within a three-dimensional (3D) environment, wherein the image data captures features within the 3D environment at each of the first set of time instances;
receive, from an inertial measurement unit (IMU), IMU data indicative of a motion of the VINS along the trajectory at a second set of time instances that is misaligned in time with the first set of time instances;
process the IMU data and the image data to compute state estimates for 3D poses of the IMU at each of the first set of time instances and 3D poses of the image source at each of the second set of time instances along the trajectory,
wherein each of the poses for the image source is computed as a linear interpolation from a subset of the poses for the IMU along the trajectory.

24. An inertial navigation system comprising:
a first sensor to produce a first set of spatial data at a first set of time instances along a trajectory within a three-dimensional (3D) environment, wherein the first set of spatial data captures features within the 3D environment at each of the first set of time instances;
a second sensor to produce a second set of spatial data for the inertial navigation system along the trajectory at a second set of time instances that is misaligned in time with the first set of time instances, wherein the second set of spatial data indicates a motion of the inertial navigation system along the trajectory; and
a processing unit comprising an estimator that processes the first set of spatial data and the second set of spatial data to compute state estimates for poses of the second sensor at each of the first set of time instances and poses of the first sensor at each of the second set of time instances along the trajectory,
wherein the estimator computes each of the poses for the second sensor as an interpolation from a subset of the poses for the first sensor along the trajectory.

25. A vision-aided inertial navigation system (VINS) comprising:
an image source to produce image data at a first set of time instances along a trajectory within a three-dimensional (3D) environment, wherein the image data captures features within the 3D environment at each of the first set of time instances;
an inertial measurement unit (IMU) to produce IMU data for the VINS along the trajectory at a second set of time instances that is misaligned in time with the first set of time instances, wherein the IMU data indicates a motion of the VINS along the trajectory; and
a processing unit comprising an estimator that processes the IMU data, the image data, or a set of features data to compute state estimates for poses of the IMU at each of the first set of time instances and poses of the image source at each of the second set of time instances along the trajectory,
wherein the estimator computes each of the poses for the IMU as an interpolation from a subset of the poses for the image source along the trajectory.

26. A vision-aided inertial navigation system (VINS) comprising:
an image source configured to produce image data that captures feature observations along a trajectory within a three-dimensional (3D) environment, wherein the image source comprises a sensor having a plurality of rows of image data, and wherein the sensor is configured to read the image data row-by-row so that each of the rows of image data corresponds to a different one of a first set of time instances along the trajectory;
an inertial measurement unit (IMU) configured to produce IMU data for the VINS along the trajectory at a second set of time instances that is misaligned in time with the first set of time instances; and
a processing unit comprising an estimator configured to process the IMU data and the image data to compute state estimates for poses of the IMU at each of the first set of time instances corresponding to the different rows of image data.

27. The VINS of claim 26, where the estimator is configured to compute state estimates for poses of the image source at each of the second set of time instances along the trajectory.

28. The VINS of claim 27, wherein the estimator is configured to compute each of the poses for the image source as an interpolation from a subset of the poses for the IMU along the trajectory.

* * * * *

UNITED STATES PATENT AND TRADEMARK OFFICE
CERTIFICATE OF CORRECTION

PATENT NO. : 10,012,504 B2
APPLICATION NO. : 14/733468
DATED : July 3, 2018
INVENTOR(S) : Stergios I. Roumeliotis et al.

It is certified that error appears in the above-identified patent and that said Letters Patent is hereby corrected as shown below:

In the Claims

Column 18, Line 35 (Claim 2): Replace "linear interpolation" with --a linear interpolation--

Column 18, Lines 39-40 (Claim 3): Replace "poses of the image source" with --the poses of the image source--

Column 18, Line 64 (Claim 5): Replace "of poses for the IMU" with --of the poses for the IMU--

Column 19, Line 1 (Claim 6): Replace "a ratio of the distances" with --a ratio of distances--

Column 19, Line 13 (Claim 8): Replace "the first time instance" with --the first set of time instances--

Column 19, Line 28 (Claim 9): Replace "and inserts the cloned pose" with --and insert the cloned pose--

Column 19, Line 47 (Claim 11): Replace "window, corresponding to" with --window corresponding to--

Column 19, Line 54 (Claim 11): Replace "the velocity and position" with --a velocity and a position--

Column 20, Line 3 (Claim 14): Replace "first set of time instances time instances" with --first set of time instances--

Column 20, Line 36 (Claim 19): Replace "for each of poses" with --for each of the poses--

Column 20, Line 38 (Claim 19): Replace "the distances" with --distances--

Column 20, Line 54 (Claim 22): Replace "producing data" with --producing image data--

Signed and Sealed this
Fourth Day of June, 2019

Andrei Iancu
*Director of the United States Patent and Trademark Office*

Column 20, Line 55 (Claim 22): Replace "inserts the cloned pose" with --inserting the cloned pose--

Column 21, Line 7 (Claim 23): Replace "set of time instances;" with --set of time instances; and--